US012497014B2

United States Patent
LeVesque et al.

(10) Patent No.: US 12,497,014 B2
(45) Date of Patent: Dec. 16, 2025

(54) BRAKE SYSTEM

(71) Applicant: Oshkosh Corporation, Oshkosh, WI (US)

(72) Inventors: Benjamin J. LeVesque, Royal Oak, MI (US); Brian D. Bartley, Hartland, MI (US); Benjamin L. Brooke, Livonia, MI (US); Alan W. McGowan, Wixom, MI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 762 days.

(21) Appl. No.: 17/844,843

(22) Filed: Jun. 21, 2022

(65) Prior Publication Data
US 2023/0406281 A1 Dec. 21, 2023

(51) Int. Cl.
*F16D 66/00* (2006.01)
*B60T 13/66* (2006.01)
*B60T 17/22* (2006.01)

(52) U.S. Cl.
CPC ............ *B60T 17/22* (2013.01); *B60T 13/662* (2013.01); *B60T 2270/406* (2013.01)

(58) Field of Classification Search
CPC ... B60T 17/22; B60T 13/662; B60T 2270/406
(Continued)

(56) References Cited

U.S. PATENT DOCUMENTS 4,186,822 A * 2/1980 Khuntia ................. F16D 66/02
116/223
4,356,897 A * 11/1982 Urban ................... F16D 55/224
188/72.8
(Continued)

FOREIGN PATENT DOCUMENTS

CN 201779083 U 3/2011
CN 109099131 A 12/2018
(Continued)

OTHER PUBLICATIONS

International Search Report and Written Opinion issued in connection with PCT/US2024/028753 dated Mar. 4, 2025.
(Continued)

*Primary Examiner* — Christopher P Schwartz
(74) *Attorney, Agent, or Firm* — FOLEY & LARDNER LLP

(57) ABSTRACT

A vehicle includes a chassis, multiple tractive elements coupled with the chassis, and a brake system. The brake system includes a caliper body that defines a sealed inner volume, a piston, a spring, a valve, brake pads, a movable member, and a position sensor. The piston is positioned within the sealed inner volume and divides the sealed inner volume into a first sub-volume and a second sub-volume. The spring is within the first sub-volume and biases the piston to extend. The valve fluidly couples the second sub-volume with a pump. The brake pads are configured to be driven by the piston to engage a brake rotor. The movable member is coupled with the piston and is configured to translate with translation of the piston. The position sensor is operably coupled with the movable member and configured to generate a signal responsive to translation of the piston and the movable member.

14 Claims, 13 Drawing Sheets

(58) Field of Classification Search
USPC .......... 188/1.11 E, 1.11 L, 1.11 R, 72.4, 170
See application file for complete search history.

(56) References Cited

U.S. PATENT DOCUMENTS

| | | | |
|---|---|---|---|
| 5,330,034 | A | 7/1994 | Rancourt et al. |
| 6,076,639 | A * | 6/2000 | Dahlen ................... F16D 66/02 |
| | | | 188/1.11 R |
| 7,693,638 | B2 | 4/2010 | Costin et al. |
| 8,430,213 | B2 * | 4/2013 | Yokoyama .............. F16D 65/18 |
| | | | 188/71.7 |
| 8,543,304 | B2 | 9/2013 | Hilberer |
| 8,776,958 | B2 * | 7/2014 | Shiraki ................. F16D 65/567 |
| | | | 188/71.9 |
| 10,352,372 | B2 | 7/2019 | Weidemann et al. |
| 10,850,601 | B2 | 12/2020 | Han et al. |
| 10,941,826 | B2 * | 3/2021 | Muniraju ................... G01D 5/40 |
| 11,707,980 | B2 | 7/2023 | Payne |
| 2005/0258682 | A1 * | 11/2005 | Halasy-Wimmer ..... F16D 65/18 |
| | | | 188/72.4 |
| 2005/0258683 | A1 * | 11/2005 | Yamaguchi .............. F16D 65/18 |
| | | | 188/162 |
| 2007/0132309 | A1 * | 6/2007 | Knop ....................... F16D 65/18 |
| | | | 303/3 |
| 2008/0194374 | A1 | 8/2008 | Diosi et al. |
| 2009/0088937 | A1 | 4/2009 | Matsubara et al. |
| 2009/0098976 | A1 | 4/2009 | Usoro et al. |
| 2009/0205910 | A1 * | 8/2009 | Cahill ................... F16D 66/026 |
| | | | 73/129 |
| 2011/0139571 | A1 | 6/2011 | Acker et al. |
| 2011/0168502 | A1 | 7/2011 | Linhoff et al. |
| 2011/0312459 | A1 | 12/2011 | Morrow et al. |
| 2013/0196806 | A1 | 8/2013 | Morrow et al. |
| 2013/0317683 | A1 | 11/2013 | Terakawa et al. |
| 2014/0000990 | A1 | 1/2014 | Shiraki |
| 2014/0269145 | A1 | 9/2014 | Fasana et al. |
| 2015/0283894 | A1 | 10/2015 | Morrow et al. |
| 2016/0238110 | A1 | 8/2016 | Morrow et al. |
| 2016/0273650 | A1 | 9/2016 | Fujii et al. |
| 2016/0288779 | A1 | 10/2016 | Kotloski et al. |
| 2016/0288780 | A1 | 10/2016 | Shukla et al. |
| 2016/0311253 | A1 | 10/2016 | Palmer et al. |
| 2016/0361987 | A1 | 12/2016 | Morrow et al. |
| 2017/0108085 | A1 | 4/2017 | Morrow et al. |
| 2017/0136870 | A1 | 5/2017 | Littlefield et al. |
| 2017/0246946 | A1 | 8/2017 | Morrow et al. |
| 2017/0246947 | A1 | 8/2017 | Kotloski et al. |
| 2017/0253229 | A1 | 9/2017 | Shukla et al. |
| 2017/0363180 | A1 | 12/2017 | Steinberger et al. |
| 2017/0370446 | A1 | 12/2017 | Steinberger et al. |
| 2018/0031085 | A1 | 2/2018 | Steinberger et al. |
| 2018/0162351 | A1 | 6/2018 | Shukla et al. |
| 2018/0222484 | A1 | 8/2018 | Shively et al. |
| 2018/0259042 | A1 | 9/2018 | Morrow et al. |
| 2018/0326832 | A1 | 11/2018 | Kotloski et al. |
| 2018/0345783 | A1 | 12/2018 | Morrow et al. |
| 2019/0111910 | A1 | 4/2019 | Shukla et al. |
| 2019/0242460 | A1 | 8/2019 | Morrow et al. |
| 2019/0366828 | A1 | 12/2019 | Morrow et al. |
| 2020/0018332 | A1 | 1/2020 | Malloy |
| 2020/0039341 | A1 | 2/2020 | Morrow et al. |
| 2020/0040984 | A1 | 2/2020 | Chen et al. |
| 2020/0062059 | A1 | 2/2020 | Watling |
| 2020/0200237 | A1 | 6/2020 | Steinberger et al. |
| 2020/0200238 | A1 | 6/2020 | Steinberger et al. |
| 2020/0307530 | A1 | 10/2020 | Georgin |
| 2020/0346855 | A1 | 11/2020 | Rocholl et al. |
| 2020/0346856 | A1 | 11/2020 | Rocholl et al. |
| 2020/0346857 | A1 | 11/2020 | Rocholl et al. |
| 2020/0346858 | A1 | 11/2020 | Buege et al. |
| 2020/0346859 | A1 | 11/2020 | Buege et al. |
| 2020/0346860 | A1 | 11/2020 | Buege et al. |
| 2020/0346861 | A1 | 11/2020 | Rocholl et al. |
| 2020/0346862 | A1 | 11/2020 | Rocholl et al. |
| 2020/0347659 | A1 | 11/2020 | Rocholl et al. |
| 2020/0399107 | A1 | 12/2020 | Buege et al. |
| 2021/0018072 | A1 | 1/2021 | Steinberger et al. |
| 2021/0140517 | A1 | 5/2021 | Steinberger et al. |
| 2021/0178890 | A1 | 6/2021 | Steinberger et al. |
| 2021/0188076 | A1 | 6/2021 | Morrow et al. |
| 2022/0025960 | A1 | 1/2022 | Steinberger et al. |
| 2022/0106114 | A1 | 4/2022 | Buege et al. |
| 2022/0106115 | A1 | 4/2022 | Buege et al. |
| 2022/0169444 | A1 | 6/2022 | Rocholl et al. |
| 2022/0267090 | A1 | 8/2022 | Rocholl et al. |
| 2022/0307312 | A1 | 9/2022 | Rocholl et al. |
| 2022/0340359 | A1 | 10/2022 | Rocholl et al. |
| 2022/0380123 | A1 | 12/2022 | Buege et al. |
| 2022/0389989 | A1 | 12/2022 | Mattsson et al. |
| 2023/0039974 | A1 | 2/2023 | Rocholl et al. |
| 2023/0278786 | A1 | 9/2023 | Rocholl et al. |
| 2023/0286741 | A1 | 9/2023 | Buege et al. |
| 2023/0382640 | A1 | 11/2023 | Buege et al. |
| 2023/0407695 | A1 | 12/2023 | Rocholl et al. |
| 2024/0066981 | A1 | 2/2024 | Schimke et al. |
| 2024/0116706 | A1 | 4/2024 | Rocholl et al. |
| 2024/0117878 | A1 | 4/2024 | Mattsson |
| 2024/0131728 | A1 | 4/2024 | Buege et al. |
| 2024/0166434 | A1 | 5/2024 | Rocholl et al. |
| 2024/0167541 | A1 | 5/2024 | Steinberger et al. |
| 2024/0217732 | A1 | 7/2024 | Wente et al. |
| 2024/0217735 | A1 | 7/2024 | Rocholl et al. |

FOREIGN PATENT DOCUMENTS

| | | |
|---|---|---|
| DE | 10 2012 007 622 A1 | 10/2013 |
| DE | 10 2020 206 125 A1 | 11/2021 |
| JP | 2006-161899 A | 6/2006 |
| KR | 20180138420 A | 12/2018 |

OTHER PUBLICATIONS

International Search Report and Written Opinion issued in connection with PCT/US2024/028871 dated Mar. 4, 2025.
International Search Report and Written Opinion issued in connection with PCT Appl. No. PCT/US2023/024323 dated Jan. 23, 2024.
Invitation to Pay Additional Fees issued in connection with PCT Appl. No. PCT/US2023/024323 dated Dec. 8, 2023.
International Search Report and Written Opinion issued in connection with PCT/US2024/048164 dated Jan. 23, 2025.

* cited by examiner

BRAKE SYSTEM

STATEMENT REGARDING FEDERALLY-SPONSORED RESEARCH OR DEVELOPMENT

This invention was made with Government support under contract W15QKN-17-9-1025, awarded by the Department of Defense. The Government has certain rights in this invention.

BACKGROUND

The present disclosure relates to a brake system for a vehicle. More specifically, the present disclosure relates to a brake detection system.

SUMMARY

One embodiment relates to a vehicle. The vehicle includes a chassis, multiple tractive elements coupled with the chassis, and a brake system. The brake system includes a caliper body that defines a sealed inner volume, a piston, a spring, a valve, brake pads, a movable member, and a position sensor. The piston is positioned within the sealed inner volume and divides the sealed inner volume into a first sub-volume and a second sub-volume. The spring is positioned within the first sub-volume and is configured to bias the piston to extend. The brake pads are configured to be driven by the piston (and/or the spring) to engage a brake rotor. The valve is configured to fluidly couple the second sub-volume with a pump. The movable member is coupled with the piston and is configured to translate with translation of the piston. The position sensor is operably coupled with the movable member and configured to generate a signal responsive to translation of the piston and the movable member.

Another embodiment relates to a brake system for a tractive element of a vehicle. The brake system includes a caliper body that defines a sealed inner volume, a piston, a spring, a valve, brake pads, a movable member, and a position sensor. The piston is positioned within the sealed inner volume and divides the sealed inner volume into a first sub-volume and a second sub-volume. The spring is positioned within the first sub-volume and is configured to bias the piston to extend. The brake pads are configured to be driven by the piston (and the spring) to engage a brake rotor. The valve is configured to fluidly couple the second sub-volume with a pump. The movable member is coupled with the piston and is configured to translate with translation of the piston. The position sensor is operably coupled with the movable member and configured to generate a signal responsive to translation of the piston and the movable member.

Another embodiment relates to a control system for a brake. The control system includes a position sensor, a pressure sensor, and a controller. The position sensor is configured to measure a position of a piston assembly of the brake. The pressure sensor is configured to measure a brake pressure within a chamber of the brake. The controller is configured to operate a pump to adjust the brake pressure of the chamber in a direction that drives the piston assembly such that brake pads of the brake are moved out of engagement with a rotor. The controller is also configured to record the brake pressure of the chamber at which the piston begins to translate such that the brake pads move out of engagement with the rotor. The controller is also configured to determine, based on the pressure of the second sub-volume at which the piston begins to translate such that the brake pads move out of engagement with the rotor, a relationship between the pressure of the second sub-volume and a braking amount. The controller is also configured to operate the pump using the relationship to perform a brake operation.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a brake system includes a caliper, piston assembly, brake pads, and a rotor.

The piston assembly is positioned within a body of the caliper and divides an inner volume of the body into two chamber. Movement of the piston assembly in a first direction causes the brake pads to drive into contact with, and exert a force on the rotor, while movement of the piston assembly in a second direction causes the brake pads to release or move out of contact with the rotor. The brake system includes a spring positioned within one of the chambers that biases the piston assembly to move in the first direction and engage the rotor. The other chamber is filled with brake fluid and can be pressurized to drive the piston assembly in the second direction or depressurized so that the spring drives the piston assembly in the first direction. The brake system also includes a rod that is pushed by the piston assembly (e.g., a face of the piston assembly) when the piston assembly translates in the first direction such that the rod translates in unison with the piston assembly. Similarly, the rod is pulled to translate in the second direction by the piston assembly when the piston assembly translates in the second direction. The rod is operably coupled with a position sensor so that movement or translation of the rod (and thereby the piston assembly and the brake pads) can be measured. In some embodiments, the position sensor includes a spring that is configured to bias the rod into engagement with the piston assembly (e.g., a face of the piston assembly) so that the rod maintains engagement with the piston assembly as the piston assembly moves or translates. The brake system also includes a pressure sensor that reports current pressure of the brake fluid in the chamber. A controller is configured to use sensor data or signals provided by the position sensor and the pressure sensor to determine an amount of wear or life of the brake pads, malfunctions of the brake system, and a relationship used to control the brake system to perform braking operations.

Overall Vehicle

Figure 1:
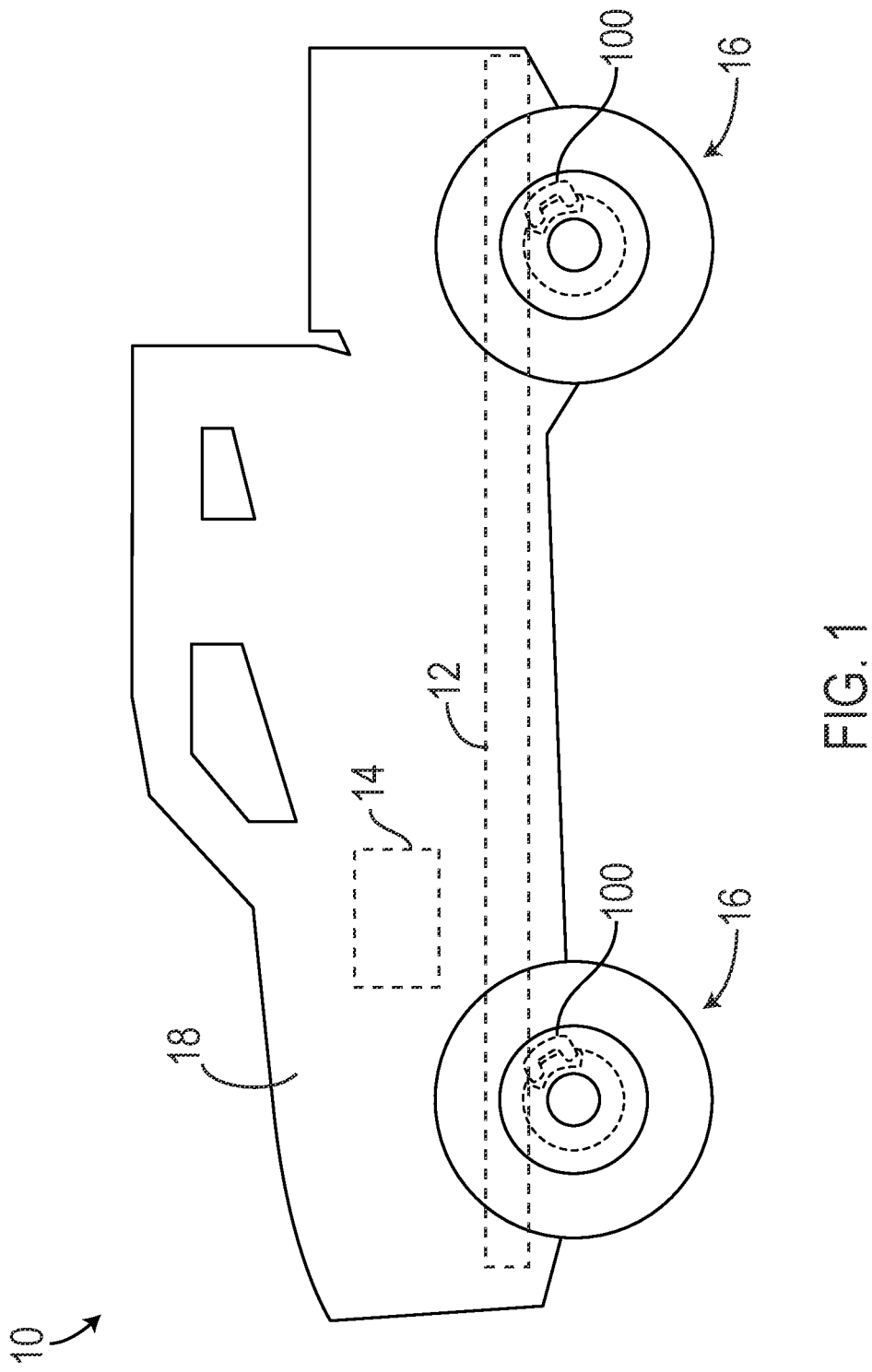
FIG. 1 is a side view of a vehicle equipped with a brake system, according to some embodiments.

According to the exemplary embodiment shown in FIG. 1, a vehicle 10 (e.g., a heavy duty vehicle, a commercial vehicle, a tank, a military vehicle, a truck, a machine, a boat, a hull, a rotational propulsive system, etc.) includes a body 18 (e.g., a shell, a cab, a cabin assembly, etc.), a chassis 12 (e.g., a frame, a hull, a carriage, etc.), tractive elements 16, and a primary mover 14 (e.g., a diesel engine, a gasoline engine, an internal combustion engine, an electric motor, etc.). The primary mover 14 and the body 18 can be supported by (e.g., fixedly coupled with) the chassis 12. In some embodiments, the primary mover 14 is coupled with the chassis (e.g., secured, fastened, or otherwise attached on the chassis 12). The primary mover 14 outputs mechanical energy in the form of torque (e.g., by driving a shaft to rotate), which can be transferred through a transmission or a driveline to transport the vehicle 10. In some embodiments, the primary mover 14 is configured to drive the tractive elements 16 to rotate to thereby transport the vehicle 10 along a ground surface. The vehicle 10 can also include a steering system that receives steering input from an operator and rotates two or more of the tractive elements 16 to indicate a turn. In some embodiments, the chassis 12, the body 18, and the primary mover 14 are supported by the tractive elements 16.

The vehicle 10 also includes one or more brake systems 100 that are positioned at the tractive elements 16 and configured to exert a braking force or torque to the tractive elements 16 to reduce a speed of the vehicle 10 (e.g., to bring the vehicle 10 to a complete stop), according to some embodiments. In some embodiments, the brake system 100 is configured to exert a torque in an opposite direction of a direction of rotation of the tractive elements 16. The brake systems 100 can include or be in communication with a controller or processing circuitry. In some embodiments, the vehicle 10 includes one or more brake systems 100 in a driveline of the vehicle 10, removed from the tractive elements 16, to thereby control or provide brake torque for multiple of the tractive elements 16.

It should be understood that while the brake system 100 as described herein is described as being a component or sub-system of the vehicle 10, the brake system 100 may also be applicable or usable with an industrial machine and function as a safety stop or brake, or be a component of a motion control system (e.g., on a lathe, a turret, etc.). The brake system 100 as described herein is also usable as a safety brake for a propeller shaft (e.g., of a ship). The brake system 100 can generally be used for any rotational propulsive element for which braking is desired. The brake system 100 can also be used with a linear machine or for linear braking.

Braking System

Overview

Figure 2:
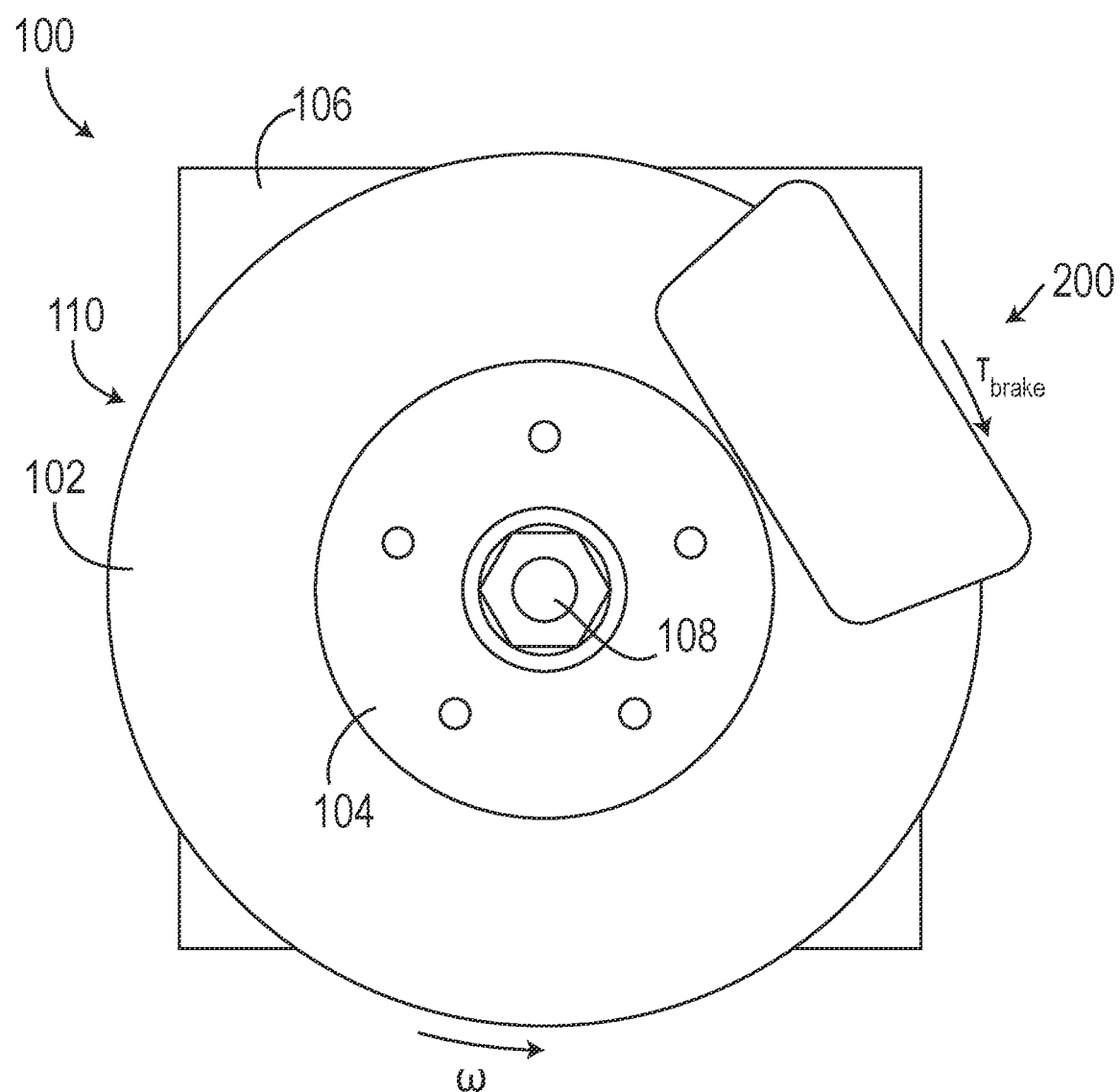
FIG. 2 is a front view of the brake system of FIG. 1 including a brake detection system, according to some embodiments.
Figure 3:
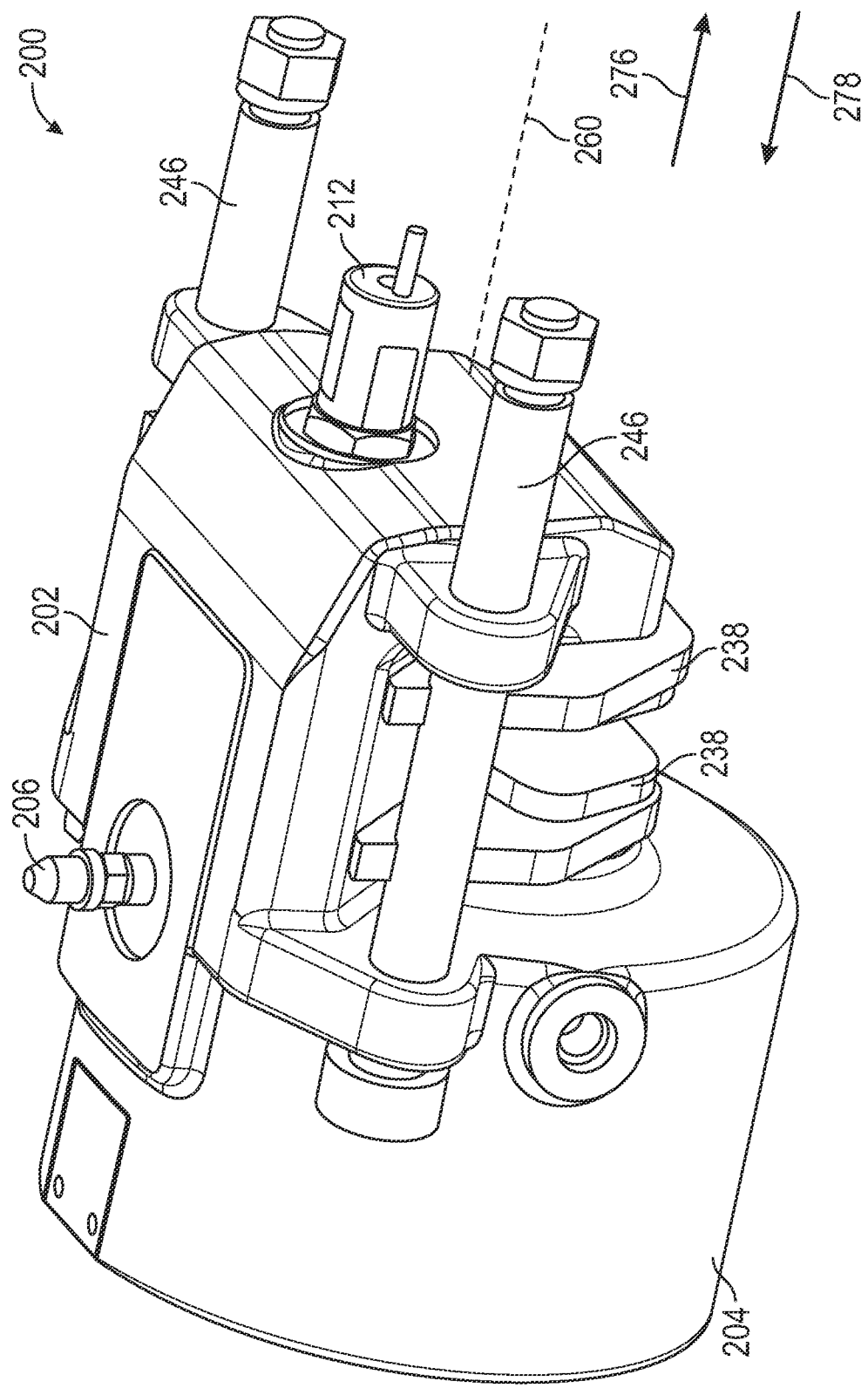
FIG. 3 is a perspective view of the brake detection system of FIG. 2, according to some embodiments.

Referring to FIG. 2, the brake system 100 includes a frame 106, an axle 108, and a rotor assembly 110. The rotor 110 includes a rotor hub 104 and a rotor flange 102 that are integrally formed with each other. The rotor hub 104 is configured to rotatably couple with an axle 108 that is driven by the primary mover 14. The rotor hub 104 is configured to couple with a hub of the vehicle 10. When fully assembly, the rotor assembly 102, the tractive element 16, and the axle 108 rotate in unison relative to the frame 106. The frame 106 can extend between the chassis 12 and the rotor assembly 110 to provide support for the rotor assembly 110.

The brake system 100 also includes a caliper system 200 (e.g., a brake caliper, a caliper assembly, a brake assembly, a brake, a caliper brake, etc.) that is fixedly coupled with the frame 106 so that the caliper system 200 does not rotate in unison with the tractive element 16 and the rotor assembly 110. The caliper system 200 is configured to exert a drag force, a brake force, a clamping force, a counter-torque, braking torque, etc., to slow the vehicle 10. In some embodiments, the caliper system 200 exerts a torque about an axis defined by the axle 108 in a direction opposite a direction of motion of the tractive element 16 and the rotor assembly 110. For example, the torque r brake may oppose the direction of motion co of the rotor assembly 110 as shown in FIG. 2.

Brake Caliper

Referring to FIGS. 3-7, the caliper system 200 includes a piston body 204 (e.g., a carriage, a frame, a body, a main portion, etc.) and a caliper body 202 (e.g., a carriage, a frame, a body, a secondary portion, etc.), according to some embodiments. The caliper system 200 also includes a pair of guide pins 246 (e.g., elongated members, rods, pins, cylinders, cylindrical members, tubular members, fasteners, etc.) disposed at opposite ends of the caliper body 202 and the piston body 204 (e.g., opposite radial ends of the caliper body 202 and the piston body 204). In some embodiments, the guide pins 246 are configured to provide a surface for translation of brake pads 238. The brake pads 238 can include both a planar or rear plate (e.g., a backing), and pad material disposed on the planar or rear plate. The brake pads 238 are positioned a space apart, shown as space 250. The rotor flange 102 is positioned between the brake pads 238 within the space 250 so that a piston assembly 226 (e.g., a translatable member, a reciprocating member, a shaft, etc.) of the caliper system 200 can operate to translate an inner one of the brake pads 238 towards the rotor flange 102 to thereby clamp the rotor flange 102 between the brake pads 238 (thereby resulting in $\tau_{brake}$).

In some embodiments, the caliper system 200 does not include the guide pins 246 (e.g., in a dual or multi caliper system with opposing piston calipers). For example, the caliper body 202 may be fixed to the frame 106 and an opposing pistons may float. In some embodiments, one or more hydraulic and/or pneumatic circuits are positioned between inner volumes of piston assemblies that are positioned on either side of the rotor 110.

The caliper system 200 includes an inner volume 208 (e.g., an interior, a void, a space, an opening, a sealed inner volume, etc.) defined between a stationary member 254 (e.g., a frame member, a backing plate, a structural member, etc.) or one or more surfaces thereof, annularly inwards facing surfaces 209 of the caliper body 202 and/or the piston body 204, and a face 256 (e.g., a surface, a boundary, a periphery, etc.). The caliper system 200 also includes the piston assembly 226 that is configured to reciprocatingly translate between one end of the inner volume 208 and an opposite end of the inner volume 208. The piston assembly 226 divides the inner volume 208 into a first sub-volume 235 (e.g., a first chamber) and a second sub-volume 236 (e.g., a second chamber). The first sub-volume 235 is defined between a first side 230 of the piston assembly 226, the surfaces 209, and the stationary member 254. The second sub-volume 236 is defined between the piston assembly 226, the surfaces 209, and the face 256. The first sub-volume 235 and the second sub-volume 236 may be fluidly separate from each other and may have a variable volume. In some embodiments, decreases in the first sub-volume 235 directly result in increase in the second sub-volume 236 (due to translation of the piston assembly 226) and vice versa. The surfaces 209 also define an annular groove 268 within which a seal 270 is positioned. The seal 270 is configured to sealingly couple with, directly engage, contact, abut, etc., an outer surface 280 (e.g., a radially outer surface, an annular surface, etc.) of the piston assembly 226.

The caliper system 200 also includes a spring 252 (e.g., a resilient member, a tensile member, a compression spring, a biasing member, etc.) that is configured to bias or drive the piston assembly 226 to translate so that the brake pad 238 (e.g., an inner one of the brake pads 238) translates towards the other brake pad 238 (e.g., towards the rotor flange 102 or into engagement with the rotor flange 102) to clamp onto the rotor flange 102. The spring 252 can be positioned within the first sub-volume 235 and engages a side or surface of the piston assembly 226 at one end, and engages (e.g., directly contacts, abuts, etc.) a corresponding portion, surface, or face of the stationary member 254. In this way, the piston assembly 226 is translatable or movable within the inner volume 208 relative to the caliper body 202 or the piston body 204. The piston assembly 226 is biased into translation so that the brake pads 238 are most proximate each other by the spring 252. The spring 252 and the first sub-volume 235 may both have an annular or ring-shape.

In some embodiments, the piston assembly 226 includes a central portion (e.g., a shaft, a stem, an elongated member, a piston etc.), shown as central shaft 232 that extends through an opening 264 (e.g., an aperture, a window, a bore, a through-hole, a hole, etc.) in a wall 262 that defines the face 256. The inner brake pad 238 is coupled with, mounted on, attached to, secured to, etc., an end of the central shaft 232. The central shaft 232 may extend through the opening 264 and sealingly couple with an inwards facing surface of the wall 262 that defines the opening 264 (e.g., an aperture, a hole, a bore, a window, etc.), according to some embodiments. In some embodiments, the wall 262 includes a seal 266 (e.g., an O-ring) that is positioned within an annular groove 284 of the wall 262 and is configured to engage with an externally facing surface 282 (e.g., an outer annular surface, a radially outwards surface, an exterior surface, etc.) of the central shaft 232 so that the central shaft 232 can translate (e.g., along the axis 260, in a direction along the axis 260) in either direction while a seal is formed between the central shaft 232 and the wall 262. In some embodiments, the externally facing surface 282 and the surface 280 have different diameters, with the surface 280 having a greater diameter than the externally facing surface 282.

Referring still to FIGS. 3-7, the second sub-volume 236 may be filled with a fluid (e.g., a hydraulic fluid). The second sub-volume 236 may store a variable amount of fluid, and the amount of fluid that is present in the second sub-volume 236 may be controlled by a pump 234 (e.g., a fluid pump). In some embodiments, the pump 234 is fluidly coupled with the second sub-volume 236 via an accumulator and a pressure control valve. In some embodiments, the second sub-volume 236 is accessible through a coupler 206 (e.g., a valve, an inlet, an opening, a conduit, etc.) that fluidly couples with the second sub-volume 236 through a channel 274 (e.g., an opening, a flow path, etc.) in the piston body 204 and/or the caliper body 202. In some embodiments, a brake line 272 (e.g., a hose, a conduit, a tubular member, a pipe, etc.) is fluidly coupled with the second sub-volume 236 through the coupler 206 and the channel 274.

The pump 234 may be operated (e.g., by a controller) to drive or pump fluid (e.g., via an accumulator and/or a pressure control valve) into the second sub-volume 236 to thereby drive the piston assembly 226 to translate in a direction that opposes a direction of force applied by the spring 252. In some embodiments, increasing the amount of fluid in the second sub-volume 236 causes a pressure within the second sub-volume 236 to increase, thereby causing the piston assembly 226 to translate towards the spring 252 (e.g., such that the second sub-volume 236 increases in size and the first sub-volume 235 decreases in size) once the pressure within the second sub-volume 236 overcomes the force applied on the piston assembly 226 by the spring 252.

In some embodiments, the caliper system 200 also includes a sensor 240 that is configured to measure a pressure within the second sub-volume 236. The sensor 240 may be configured to measure static pressure of the fluid within the second sub-volume 236. In some embodiments, the sensor 240 is configured to measure pressure along the brake line 272. The pump 234 may be operated in response to operation of a brake pedal to provide braking as desired by an operator. In some embodiments, pressing the brake pedal causes the pump 234 to operate to decrease the pressure within the second sub-volume 236, thereby allowing the piston assembly 226 to translate in a direction of the force exerted by the spring 252 (e.g., $F_{spring}$), and thereby causing increased braking (directly proportional to a decrease in an amount of force $F_{pressure}$ that is exerted due to the pressure within the second sub-volume 236).

The piston assembly 226 is capable of translating in either direction along axis 260. For example, the piston assembly 226 may translate in a clamping direction 276 (e.g., an extension direction, a first direction, etc.) or a releasing direction 278 (e.g., a retraction direction, a second direction, etc.). In some embodiments, translation of the piston assembly 226 (after the inner brake pad 238 has contacted the rotor flange 102) in the clamping direction 276 is caused by decreased pressure in the second sub-volume 236 and results in increased braking. Similarly, translation of the piston assembly 226 (while the inner brake pad 238 is contacting the rotor flange 102) in the releasing direction 278 is caused by increased pressure in the second sub-volume 236 and results in decreased braking. The face 256 and a surface of the stationary member 254 may define positional boundaries (e.g., translational boundaries, limits, etc.) of the piston assembly 226 within the inner volume 208.

Figure 4:
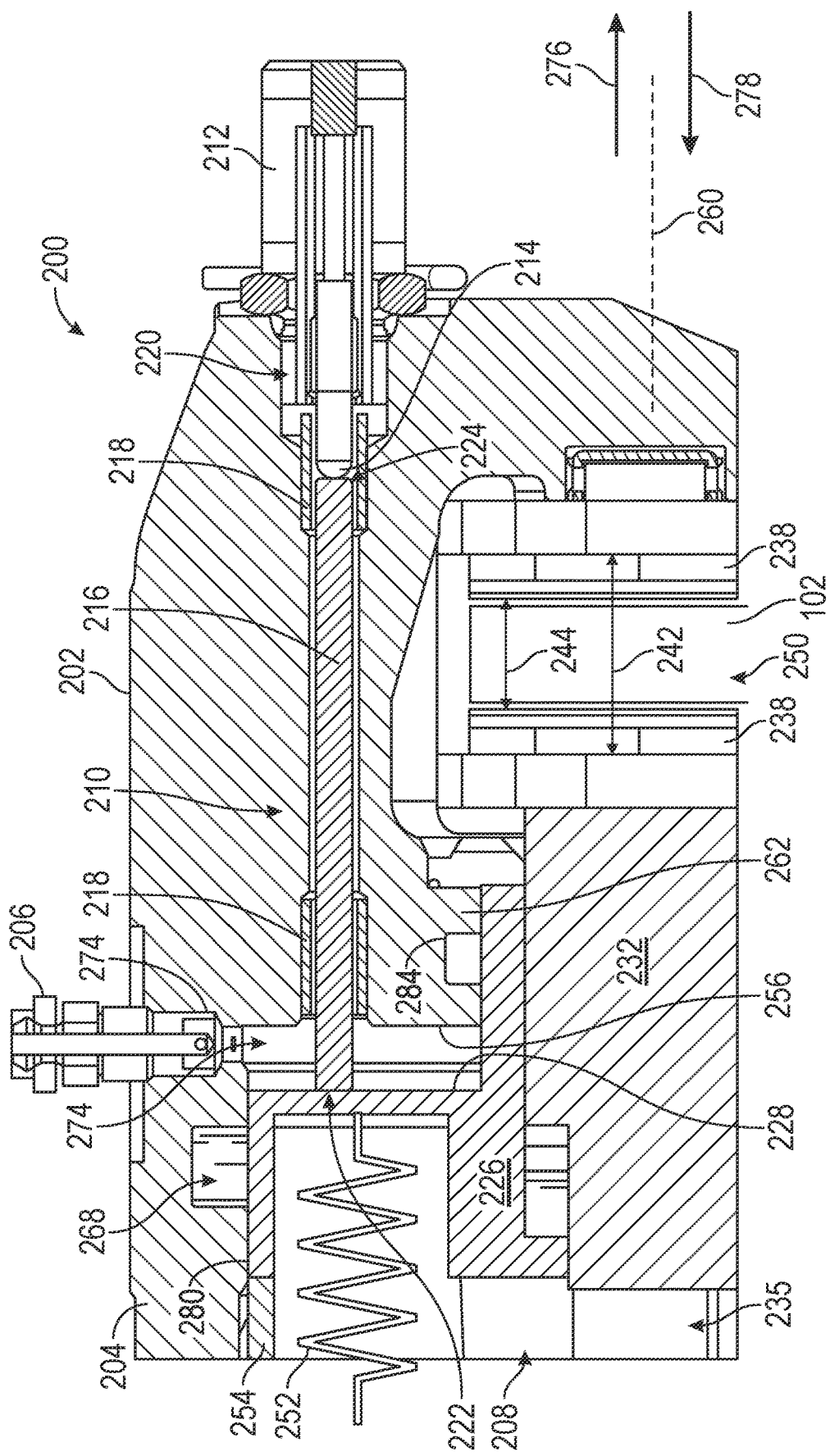
FIG. 4 is a side sectional view of a portion of the brake detection system of FIG. 3 according to some embodiments.
Figure 5:
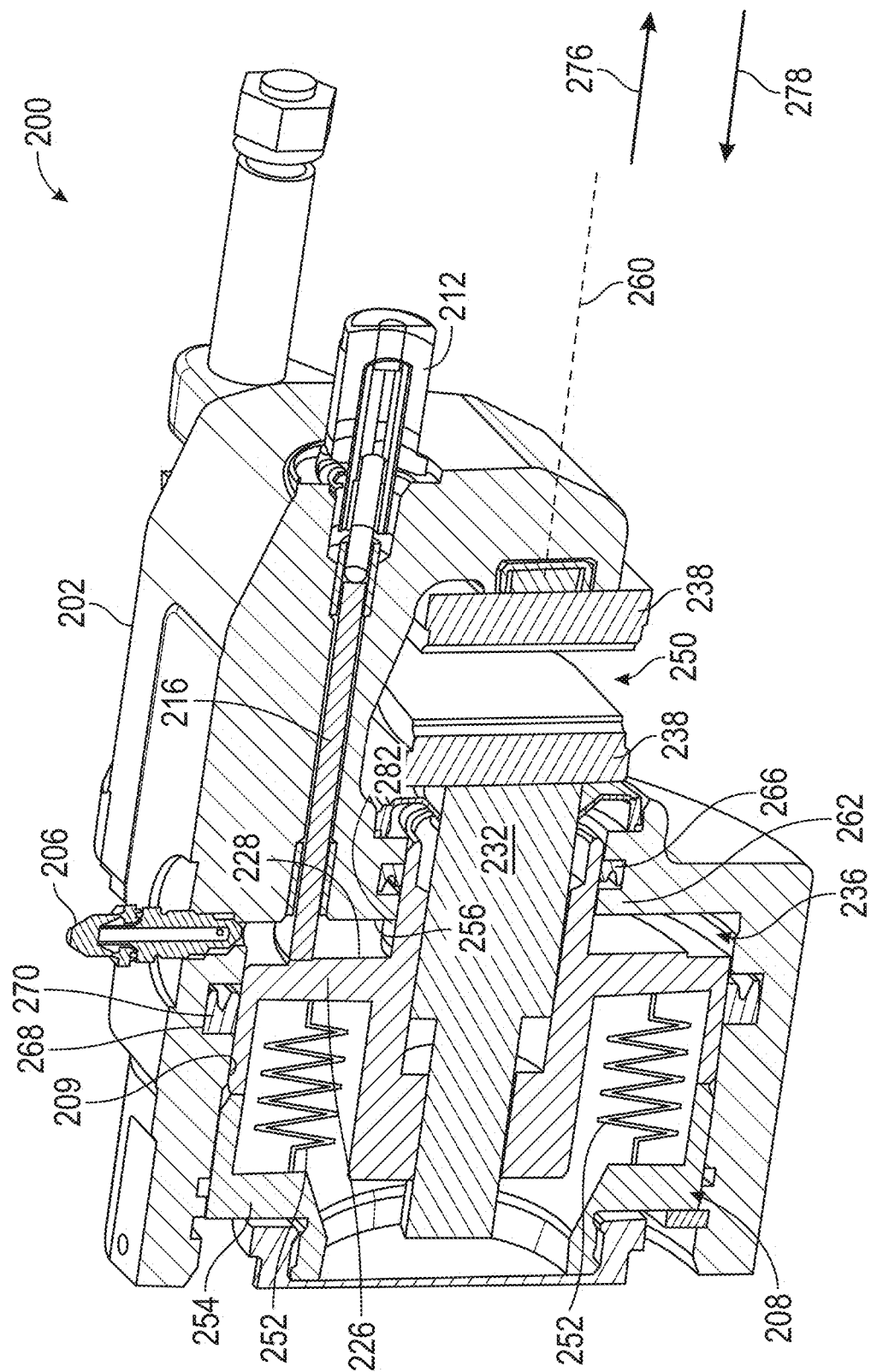
FIG. 5 is a perspective sectional view of the portion of the brake detection system of FIG. 3, according to some embodiments.
Figure 6:
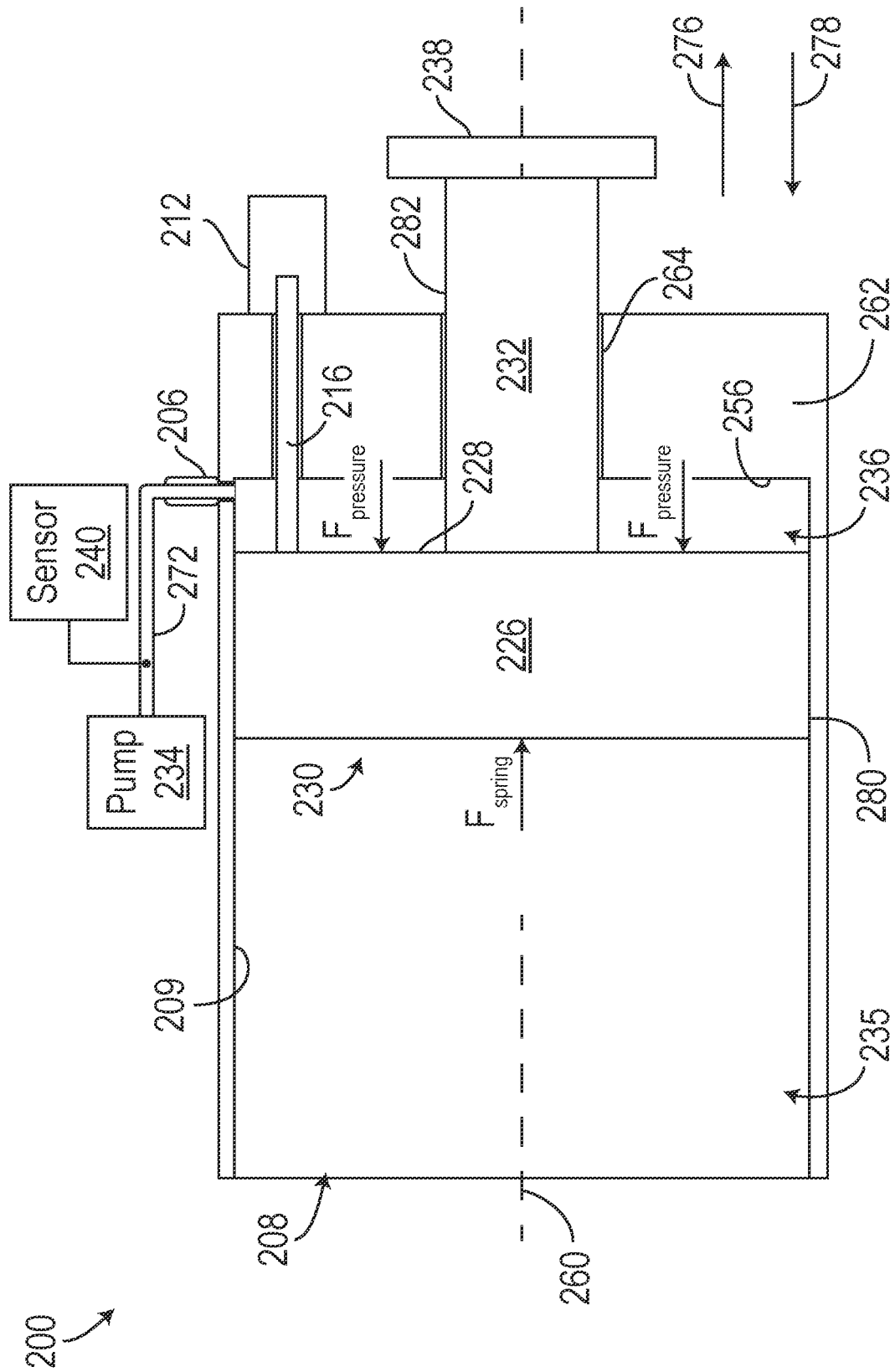
FIG. 6 is a diagram illustrating the brake detection system of FIG. 3, according to some embodiments.

Referring particularly to FIGS. 4-6, the caliper system 200 includes a positional sensor 212 (e.g., a linear potentiometer, a distance sensor, a position sensor, a movement sensor, a detector, a sensor, etc.). The caliper system 200 also includes an elongated member 216 (e.g., a pin, a rod, a push rod, an elongated member, a cylinder, a movable member, a driven member, a translatable member, etc.) that extends through a bore 210 of the caliper body 202. In some embodiments, the elongated member 216 includes a first end 222 and a second end 224 that is opposite the first end 222. In some embodiments, the first end 222 is proximate the piston assembly 226, or more specifically, abuts, contacts, or directly engages a face 228 of the piston assembly 226 as the piston assembly 226 translates in the clamping direction 276. In some embodiments, the first end 222 is attached to the face 228 of the piston assembly 226 so that translation or displacement of the piston assembly 226 directly results in translation or displacement of the elongated member 216. In some embodiments, the first end 222 is biased or held in contact with the face 228 of the piston assembly 226 by a pre-loaded spring of the positional sensor 212.

In some embodiments, the positional sensor 212 includes a sensing member 214 that is positioned within an inner volume 220 of the caliper body 202. The inner volume 220 provides a space for internal components of the positional sensor 212 and allows the positional sensor 212 to access the bore 210.

One or more bushings 218 are positioned within the bore 210 and are configured to support and slidably couple with the elongated member 216. The bushings 218 (e.g., sleeves, cylindrical members, tubular members, etc.) facilitate proper alignment and translation of the elongated member 216 so that the elongated member 216 translates with movement of the piston assembly 226 and the positional sensor 212 detects or measures the degree to which the piston assembly 226 moves. The positional sensor 212 can be configured to measure a current position or an amount of translation or displacement of the piston assembly 226 in either direction along the axis 260. Advantageously, sensor feedback from the positional sensor 212 can be used to determine a degree of wear of the brake pads 238, malfunctions of the caliper system 200, and/or a current relationship between pressure of the second sub-volume 236 and the position of the piston assembly 226 or braking amount as described in greater detail below. In the configuration shown in FIGS. 4-6, translation of the piston assembly 226 in the clamping direction 276 causes the elongated member 216 to drive towards the positional sensor 212. Similarly, translation of the piston assembly 226 in the releasing direction 278 causes the elongated member 216 to translate away from the positional sensor 212.

Figure 7:
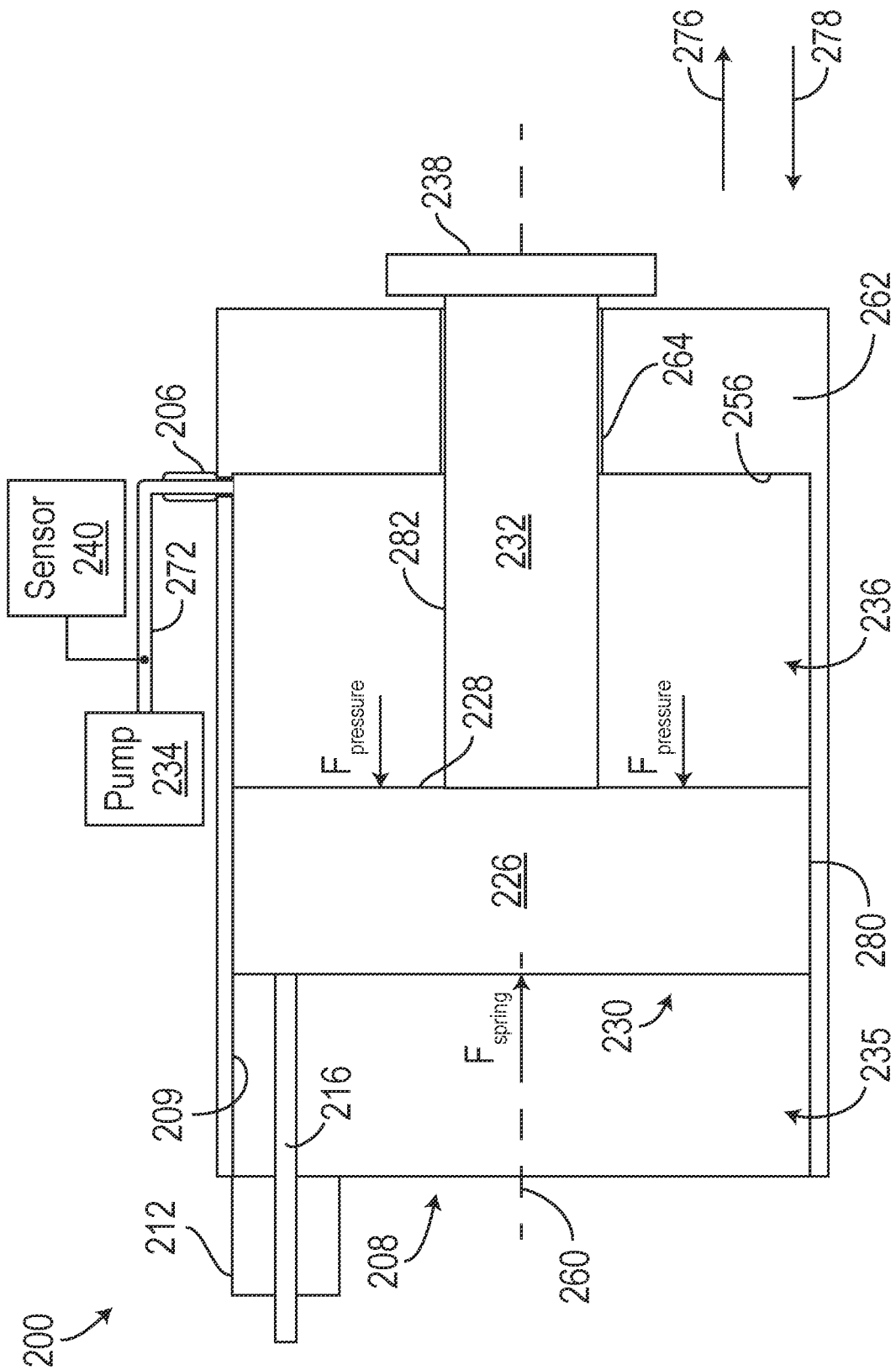
FIG. 7 is a diagram illustrating the brake detection system of FIG. 3, according to some embodiments.

Referring to FIG. 7, the caliper system 200 is shown according to another embodiment. The caliper system 200 as shown in FIG. 7 includes the positional sensor 212 but positioned on a rear side 230 of the piston assembly 226. The elongated member 216 may be coupled with or secured to the rear side 230 of the piston assembly 226. The rear side 230 is a side, surface, or portion of the piston assembly 226 that is opposite the face 228. The rear side 230 is also the side of the piston assembly 226 that faces the stationary member 254. The positional sensor 212 may be positioned or coupled with the stationary member 254. The positional sensor 212 generates signals responsive to translation of the elongated member 216 which is attached with the piston assembly 226 on the first side 230 of the piston assembly 226. Translation of the piston assembly 226 in the clamping direction 276 causes the elongated member 216 to translate away from the positional sensor 212, and translation of the piston assembly 226 in the releasing direction 278 causes the elongated member 126 to translate towards the positional sensor 212.

It should be understood that while FIGS. 3-7 show at least two different embodiments or configurations of the elongated member 216 relative to the piston assembly 226, the positional sensor 212 may otherwise be configured to detect movement (e.g., position, displacement, etc., of the piston assembly 226. For example the positional sensor 212 may be an infrared or light emitting detector positioned within the first sub-volume 235 or the second sub-volume 236 and configured to thereby measure a distance of the piston assembly 226 or a particular portion of the piston assembly 226 relative to the face 256, the stationary member 254, etc. (e.g., without being in physical contact with the piston assembly 226). Similarly, the positional sensor 212 may be positioned within the wall 262 and configured to measure movement of the piston assembly 226 (e.g., movement of the central shaft 232). In some embodiments, a translatable or rotatable member is fixedly or rotatably coupled with the piston assembly 226 such that translational movement of the piston assembly 226 in either direction is transferred into translational or rotational motion of the translatable or rotatable member. The amount of translation or rotation of the translatable or rotatable member can be measured by the positional sensor 212 and used to detect the position, and/or the displacement of the piston assembly 226.

Control System

Overview

Figure 8:
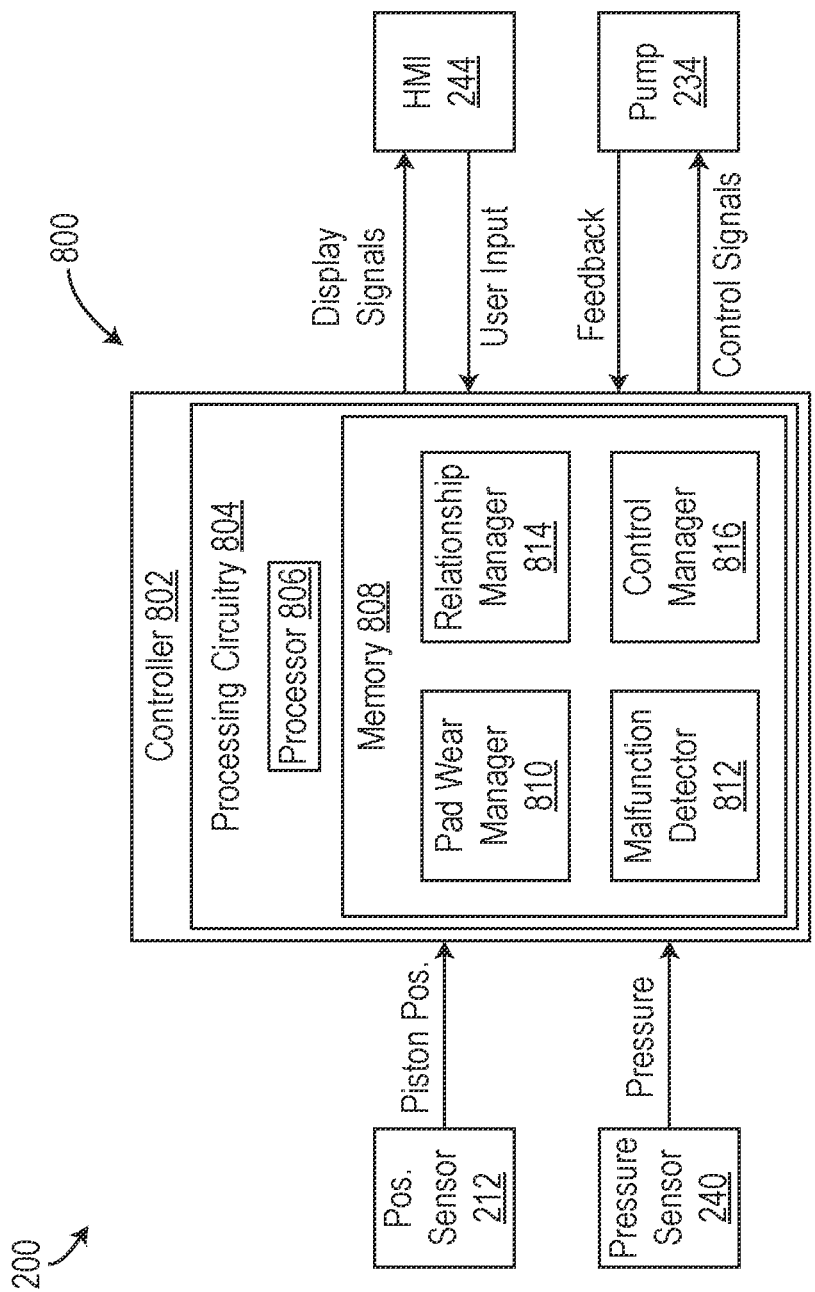
FIG. 8 is a block diagram of a control system of the brake system of FIG. 1, according to some embodiments.

Referring to FIG. 8, a control system 800 for the caliper system 200 includes a controller 802, the positional sensor 212, the pressure sensor 240, a human machine interface (HMI) 244, and the pump 234, according to some embodiments. In some embodiments, the controller 802 is configured to obtain position data (e.g., the piston position) from the positional sensor 212, and a current pressure from the pressure sensor 240. The controller 802 can be configured to use the piston position or displacement provided by the positional sensor 212 and the pressure provided by the pressure sensor 240 to determine a relationship between the piston position and the pressure (e.g., the pressure in the second sub-volume 236), to determine a pressure at which the brake pads 238 first engage the rotor flange 102, to identify a degree of pad wear of the brake pads 238, and/or to identify malfunctions of the caliper system 200. In some embodiments, the HMI 244 is not used and is therefore optional.

As shown in FIG. 8, the controller 802 includes processing circuitry 804, a processor 806, and memory 808. Processing circuitry 804 can be communicably connected to the communications interface such that processing circuitry 804 and the various components thereof can send and receive data via the communications interface. Processor 806 can be implemented as a general purpose processor, an application specific integrated circuit (ASIC), one or more field programmable gate arrays (FPGAs), a group of processing components, or other suitable electronic processing components.

Memory 808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 808 can be or include volatile memory or non-volatile memory. Memory 808 can include database components, object code components, script components, or any other type of information structure for supporting the various activities and information structures described in the present application. According to some embodiments, memory 808 is communicably connected to processor 806 via processing circuitry 804 and includes computer code for executing (e.g., by processing circuitry 804 and/or processor 806) one or more processes described herein.

In some embodiments, controller 802 is implemented within a single computer (e.g., one server, one housing, etc.). In various other embodiments, the functionality of the controller 802 can be distributed across multiple servers or computers (e.g., that can exist in distributed locations).

Pad Wear

Figure 10:
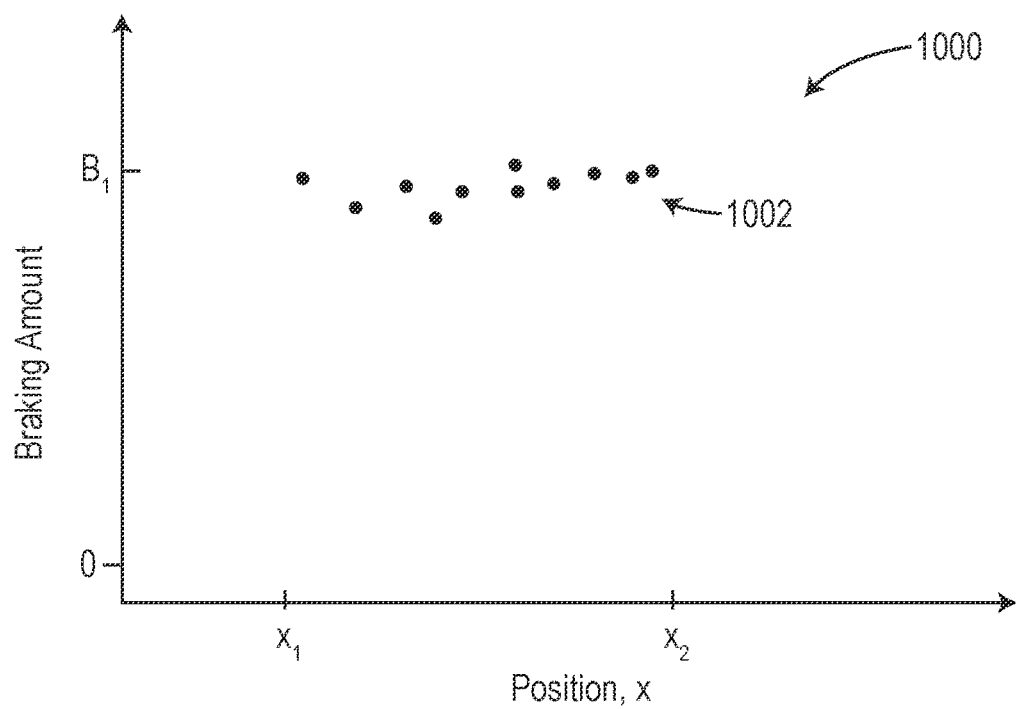
FIG. 10 is a graph illustrating a relationship between braking amount and position over time, according to some embodiments.
Figure 11:
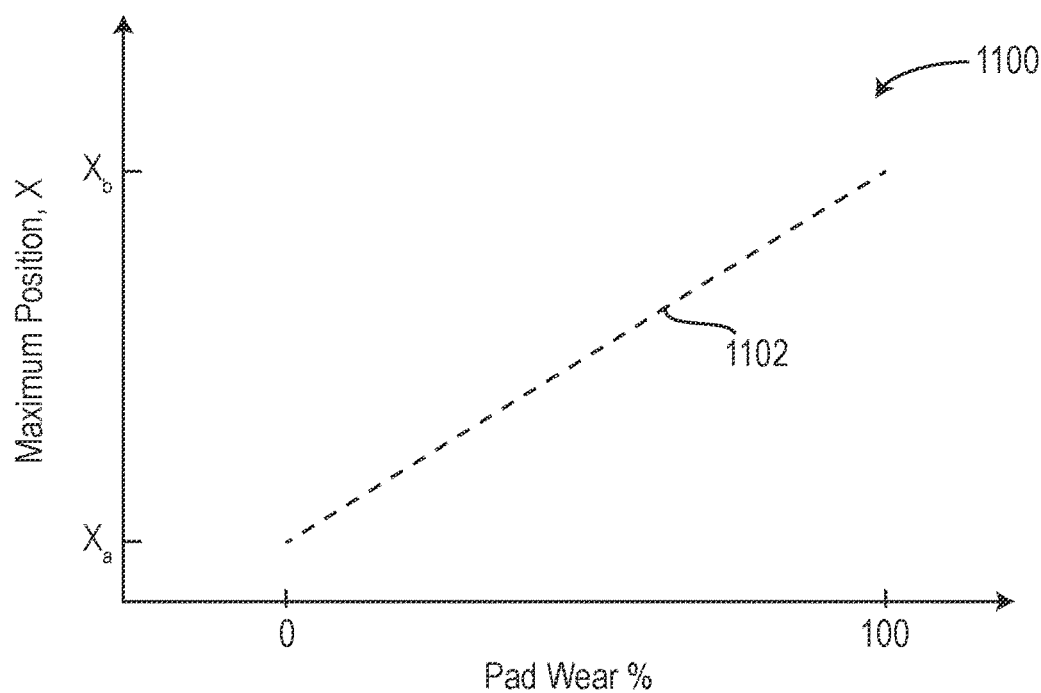
FIG. 11 is a graph illustrating a relationship between a maximum position of a brake piston and an amount of wear of brake pads, according to some embodiments.

Referring to FIGS. 8 and 10-11, the controller 802 is configured to identify, based on the piston position provided by the positional sensor 212, a degree or an amount of wear of the brake pads 238, according to some embodiments. In some embodiments, the controller 802 (e.g., the memory 808) includes a pad wear manager 810. The pad wear manager 810 is configured to obtain the piston position from the positional sensor 212 and determine, based on the piston position, the pad wear (e.g., an amount of wear, a degree of wear, an amount of pad remaining, etc.). In some embodiments, the pad wear manager 810 uses a known or predetermined relationship or function, and uses the piston position provided by the positional sensor 212 as an input to the relationship or function to determine pad wear status of the brake pads 238.

Referring particularly to FIG. 10, a graph 1000 illustrates how wearing of the brake pads 238 over time affects operation of the caliper system 200, according to some embodiments. The graph 1000 illustrates a position of the piston assembly 226 (the X-axis) required to achieve a desired (e.g., a specific or maximum) amount of braking (e.g., braking force, braking torque, etc.) (the Y-axis). For example, when the brake pads 238 are fresh and have not undergone substantial wear, the piston assembly 226 may only need to be translated to the position $x_1$ with a corresponding pressure to achieve the desired amount of braking $B_1$. However, as illustrated by data 1002, over time the piston assembly 226 may need to be translated further (e.g., up to the position $x_2$) to achieve the same desired amount of braking $B_2$ due to the wearing of the brake pads 238 and the decreased thickness of the brake pads 238. In order to compensate for the decreased thickness of the brake pads 238, the piston assembly 226 needs to be translated further (e.g., increasing an amount of displacement of the piston assembly 226 in the direction 276) to achieve the same amount of braking.

Referring particularly to FIGS. 11 and 8, a graph 1100 illustrates a relationship 1102 that is usable by the pad wear manager 810 to detect or determine an amount of pad wear (e.g., pad wear %) based on a current position of the piston assembly 226 as provided by the positional sensor 212, according to some embodiments. In some embodiments, the Y-axis of the graph 1100 illustrates a maximum position of the piston assembly 226 (e.g., in the clamping direction 276). In some embodiments, the maximum position of the piston assembly 226 indicates a position of the piston assembly 226 or a reading of the positional sensor 212 when the brake pads 238 are in contact with the rotor flange 102 (e.g., when the second sub-volume 236 is depressurized).

The relationship 1102 can be used to determine the pad wear (e.g., an amount or percent of pad wear) as a function of the maximum position. The maximum position is the sensor reading of the positional sensor 212 when the piston assembly 226 is translated in the clamping direction 276 a maximum amount (e.g., until the brake pads 238 are in contact with the rotor flange 102. The maximum position can be identified when changes in the operation of the pump 234 or changes in the pressure of the second sub-volume 236 do not result in any additional translation of the piston assembly 226 in the clamping direction 276. For example, the controller 102, or more particularly, the pad wear manager 810, may monitor the pressure feedback from the pressure sensor 240 as the pump 234 is operated to translate the piston assembly 226 (e.g., to decrease the pressure in the second sub-volume 236) in the clamping direction 276. The controller 102, or more particularly, the pad wear manager 810 may also monitor the sensor feedback provided by the positional sensor 212 while the pump 234 operates. Once the pressure or the operation of the pump 234 continues to change but the piston assembly 226 stops translating in the clamping direction 276, the pad wear manager 810 may determine that the piston assembly 226 is at the maximum position (e.g., a maximum clamp position).

The pad wear manager 810 uses the maximum position of the piston assembly 226 and a function, relationship, equation, which is visualized by the relationship 1102, to determine the amount of pad wear. In some embodiments, the relationship 1102 is a linear relationship as shown. In other embodiments, the relationship 1102 is non-linear.

The relationship 1102 can be determined based on known positions of the piston assembly 226 for different pad wear amounts. For example, when the brake pads 238 are new and have not undergone any significant wear, a maximum position $X_a$ of the piston assembly 226 may be associated with 0% pad wear. In some embodiments, the relationship 1102 is determined by the pad wear manager 810 based on the initial maximum position $X_a$ of the piston assembly 226 when the brake pads 238 are fresh and unworn, and based on a known thickness of the brake pads 238. For example, the pad wear manager 810 can obtain, from the positional sensor 212, the initial maximum position $X_a$, the pad wear manager 810 can determine a second maximum position, $X_b$, when the brake pads 238 are completely worn (e.g., 100% worn) by adding the known thickness of the brake pads 238 (e.g., $X_b = X_a \Delta X_{thickness}$ where $\Delta X_{thickness}$ is the known thickness of the brake pads 238) since decreased thickness of the brake pads 238 due to wearing, will result in a proportional increase in the maximum position $X_b$ (e.g., the piston assembly 226 must be translated further in the clamping direction 276 to make up for the worn or thinner brake pads 238). The points [0, $X_a$] and [100, $X_b$] can be used to determine the relationship 1102 (e.g., by performing a linear regression on the points [0, $X_a$] and [100, $X_b$]).

In some embodiments, the pad wear manager 810 stores and uses a predetermined relationship (e.g., a function, an equation, a graph, a table, etc.) to determine the pad wear amount given a current value of the maximum position X of the piston assembly 226 (e.g., X). The pad wear manager 810 is configured to use the predetermined relationship and the maximum position of the piston assembly 226 to determine the pad wear, according to some embodiments.

In this way, the pad wear manager 810 can calculate, determine, detect, estimate, etc., a pad wear percent (e.g., an amount or percentage of the brake pads 238 that has worn) of the brake pads 238 by using either a relationship that is determined by the pad wear manager 810, or stored in the memory 808 of the controller 802. In some embodiments, the pad wear manager 810 is also configured to determine the amount of pad that is remaining on the brake pads 238. The amount of pad that is remaining may be a distance (e.g., inches, centimeters, etc.) or a percent of a total thickness of the pads when the brake pads 238 are fresh (e.g., 50% remaining, 30% remaining, etc.).

Figure 13:
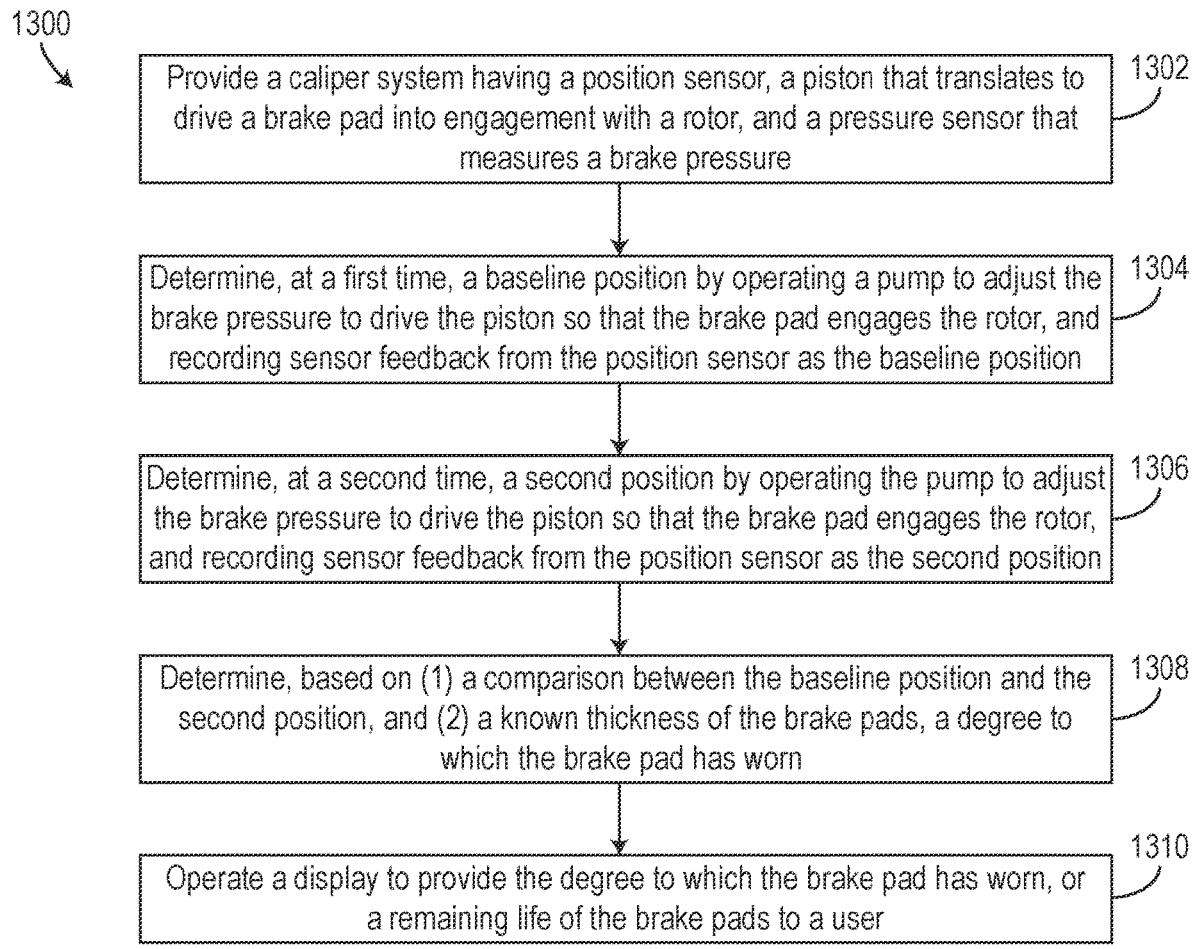
FIG. 13 is a flow diagram of a process for determining an amount of wear of brake pads, according to some embodiments.

Referring to FIG. 13, a process 1300 for determining an amount of wear of a brake pad or an amount of brake pad remaining includes steps 1302-1310, according to some embodiments. The process 1300 may be performed by the controller 802 or by the caliper system 200. In some embodiments, one or more steps of the process 1300 are performed intermittently over a life span of the brake pads 238. For example, portions of the process 1300 can be performed when the brake pads 238 are first installed or replaced, and portions of the process 1300 may be repeatedly performed throughout a lifetime of the brake pads 238 until the brake pads 238 are replaced.

Referring still to FIG. 13, the process 1300 includes providing a caliper system having a position sensor, a piston that translates to drive a brake pad into engagement with a rotor, and a pressure sensor that measures a brake pressure (step 1302), according to some embodiments. In some embodiments, the caliper system is the caliper system 200. The caliper system 200 can include a piston that is driven or bias to translate such that the brake pads engage the rotor by a spring, and driven in an opposite direction by pressurization of a chamber with brake fluid. In this way, operation to decrease the brake pressure results in increased braking whereas operation to increase the brake pressure results in decreased braking.

The process 1300 also includes determining, at a first time, a baseline position by operating a pump to adjust the brake pressure to drive the piston so that the brake pad engages the rotor, and recording sensor feedback from the position sensor as the baseline position (step 1304), according to some embodiments. In some embodiments, the baseline position is the feedback from the position sensor when the brake pads first engage the rotor. In some embodiments, the baseline position indicates an expected amount or degree of extension of the piston when the brake pads are fresh or unworn. In some embodiments, step 1304 is performed by the pad wear manager 810 based on sensor feedback provided by the positional sensor 212 and/or the pressure sensor 240. For example, the pad wear manager 810 may monitor changes in the pressure provided by the pressure sensor 240 as the caliper system is operated to perform a braking operation and, once the piston position provided by the positional sensor 212 stops changing while the pressure is still changing, identify that the position of the piston at which the piston stops moving but the pressure continues to change, is the position of the piston when the brake pads first engage the rotor. In some embodiments, the process 1300 includes initializing or performing step 1304 at a startup of the system that the caliper system provides braking for (e.g., the vehicle 10, an industrial machine, etc.). In some embodiments, the process 1300 includes measuring a pressure point at ignition or startup of the vehicle 10 while the vehicle 10 is stationary (or performing step 1304 when the vehicle 10 first starts up and is stationary and prior to the vehicle 10 or the system that the caliper system serves moving). In some embodiments, if there are separate control circuits (e.g., hydraulic or pneumatic circuits) for front and rear axles, the process 1300 may initialize and perform step 1304 at a specific time when it is known that the vehicle will be stationary. The step 1304 may be re-performed later to thereby adjust the baseline position during operation. Re-performing step 1304 at a later point of operation may facilitate improved analysis and optimization of pressure rise, fall, or pulsation, to minimize brake wear.

The process 1300 also includes determining, at a second time, a second position by operating the pump (e.g., by controlling an accumulator and a pressure control valve) to adjust the brake pressure to drive the piston so that the brake pad engages the rotor, and recording sensor feedback from the position sensor as the second position (step 1306), according to some embodiments. In some embodiments, step 1306 is the same as or similar to the step 1304. In some embodiments, the step 1306 is performed at a later time or later during life of the brake pads. For example, the step 1306 may be performed after a certain number of braking operations have been performed, after a specific runtime, etc. In some embodiments, the step 1306 is performed every time a braking operation is performed and the brake pads are driven into engagement with the rotor. In some embodiments, the step 1306 is performed by the pad wear manager 810.

The process 1300 includes determining, based on (i) a comparison between the baseline position and the second position, and (ii) a known thickness of the brake pads, a degree to which the brake pad has worn (step 1308), according to some embodiments. In some embodiments, step 1308 is performed based on the known thickness of the brake pads when the brake pads are unworn (e.g., when the brake pads are fresh). In some embodiments, step 1308 is performed based on a relationship that defines changes in the baseline position and the second position to an amount of wear of the brake pads. In some embodiments, step 1308 is performed to predict or determine an amount, a percentage, a degree, etc., of wear of the brake pads, or an amount, a percentage, a degree, etc., of remaining material of the brake pads. In some embodiments, step 1308 is performed by the pad wear manager 810.

The process 1300 includes operating a display to provide the degree to which the brake pad has worn, or a remaining life of the brake pads to a user (step 1310), according to some embodiments. In some embodiments, step 1310 is performed by the pad wear manager 810 or the controller 802. In some embodiments, step 1310 is performed by the controller 802 or a control system of the vehicle 10. In some embodiments, the step 1310 is performed by a display screen of the vehicle 10 that is positioned within a cab of the vehicle 10. In some embodiments, the step 1310 is performed by the HMI 244.

Relationship Manager

Figure 9:
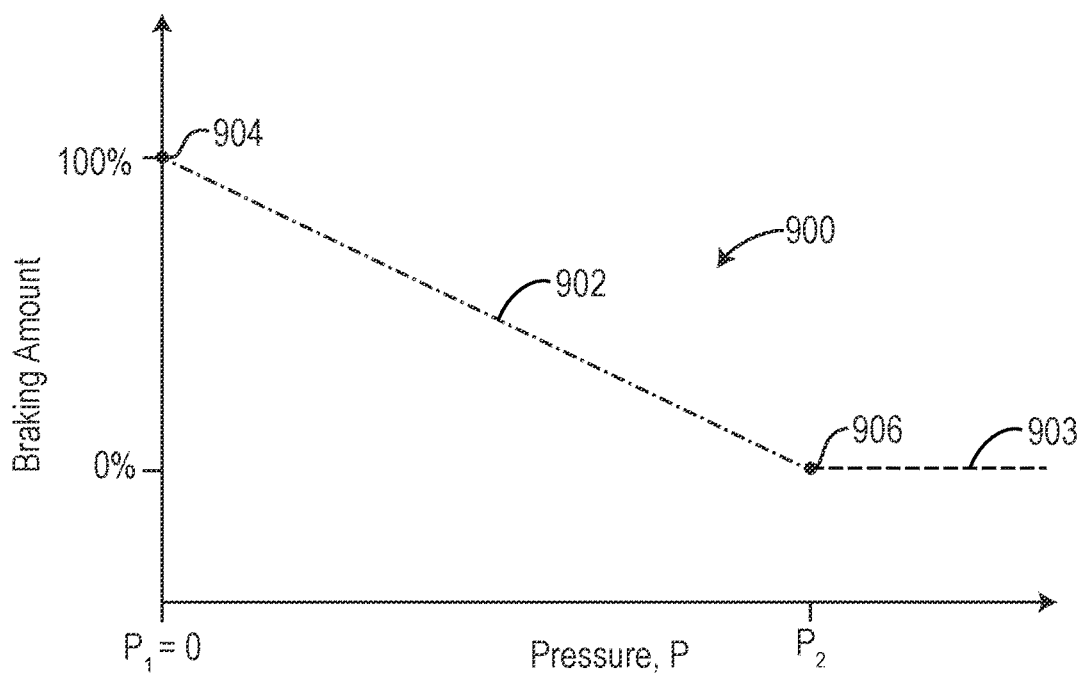
FIG. 9 is a graph illustrating braking amount and brake pressure, according to some embodiments.

Referring to FIGS. 8 and 9, the controller 802 includes a relationship manager 814 that is configured to determine a relationship between pressure of the second sub-volume 236 and an amount of braking or position of the piston assembly 226, according to some embodiments. As shown in FIG. 9, a graph 900 includes a relationship 902 that illustrates changes in pressure (the X-axis) of the second sub-volume 236 with respect to changes in braking amount (the Y-axis). The relationship 902 may be a linear relationship that is defined between a first point 904 and a second point 906. The relationship manager 814 can determine, identify, or estimate the relationship 902 which may be used by the control manager 816 to control operation of the caliper system 200 to provide a desired amount of braking responsive to an input.

In some embodiments, the relationship manager 814 is configured to determine or identify the pressure $p_2$ at which the braking amount is 0%, shown as point 906. In some embodiments, a maximum braking amount is when the piston assembly 226 is biased in the clamping direction 276 by the spring 252, without any pressurization of the second sub-volume 236 by the pump 234 (e.g., $p_1=0$) shown as point 904.

In some embodiments, the point 904 is known (e.g., a pressure of 0 within the second sub-volume 236 always result in the maximum clamping force and thereby maximum braking force). In some embodiments, the point 906 can be determined by increasing pressure within the second sub-volume 236 while monitoring the piston position provided by the positional sensor 212. In some embodiments, the relationship manager 814 continuously increases the pressure of the second sub-volume 236 by operating the pump 234 (e.g., by providing control signals to the pump 234 to introduce more fluid into the second sub-volume 236) until the piston assembly 226 begins to incrementally or substantially move (e.g., in the releasing direction 278). Once the piston assembly 226 begins to move or has moved a predetermined amount (e.g., in the releasing direction 278), the relationship manager 814 can record the pressure provided by the pressure sensor 240 as the second pressure $p_2$. The relationship manager 814 may use the second pressure $p_2$ as the X-value of the point 906, and use the known value of the first point 904 in a trend fitting or regression procedure to determine the relationship 902. In some embodiments, the relationship 902 defines an amount of braking as a function of pressure of the second sub-volume 236, or vice versa.

The relationship 902 may be provided to the control manager 816 and used to determine a pressure setting for the second sub-volume 236 to achieve a desired amount of braking as indicated by a user input provided by the HMI 244 or a mobility controller of a vehicle or machine. For example, a brake pedal may be depressed, and based on a degree of depression of the brake pedal, the HMI 244 or the brake pedal may provide a voltage or a signal to the control manager 816. If the signal indicates that 50% of a maximum amount of braking is requested, the control manager 816 can use the relationship 902 provided by the relationship manager 814 to determine a corresponding pressure of the second sub-volume 236 to achieve 50% braking power. The control manager 816 may operate the pump 234 to either increase or decrease the pressure of the second sub-volume 236 so that the pressure of the second sub-volume 236 (e.g., as indicated by the feedback from the pressure sensor 240) is substantially equal to the corresponding pressure determined based on the relationship 902 and the use input.

In some embodiments, the relationship manager 814 is configured to update the second point 906 in real-time based on most recently obtained data from the positional sensor 212 and the pressure sensor 240. For example, if the control manager 816 is operating the pump 234 to increase the pressure of the second sub-volume 236, and the piston position provided by the positional sensor 212 begins to change after being stationary (e.g., after remaining at a constant position while the pressure within the second sub-volume 236 changes), the relationship manager 814 may record the pressure of the second sub-volume 236 at which the position of the piston assembly 226 begins to change as the second pressure $p_2$. If the newly obtained value of the second pressure $p_2$ deviates from the value of the second pressure $p_2$ that is currently used for establishing the relationship 902, the relationship manager 814 may update or re-determine the relationship 902. Advantageously, calibrating, or re-determining the relationship 902 based on newly obtained data from the positional sensor 212 and/or the pressure sensor 240 allows the use of a non-linear spring 252, and allows the controller 802 to account for changes in braking functionality due to wear of the brake pads 238.

It should be understood that while the relationship 902 is shown in FIG. 9 as being linear, the relationship 902 may be non-linear in other embodiments. The relationship manager 814 can use the points 904 and 906 and a curve-fitting technique that is either linear or non-linear to determine the relationship 902 and provide the relationship 902 to the control manager 816 for use in controlling the caliper assembly 200.

In some embodiments, the second point 902 is an inflection point or knee between the relationship 902 and a constant relationship 903. For example, once the pressure is increased to $p_2$ and the brake pads 238 do not engage the rotor flange 102, increased pressure may result in the piston assembly 226 translating further in releasing direction 278, without any further reduced braking (since the pads 238 are already out of engagement with the rotor flange 102), as illustrated by constant relationship 903.

Figure 15:
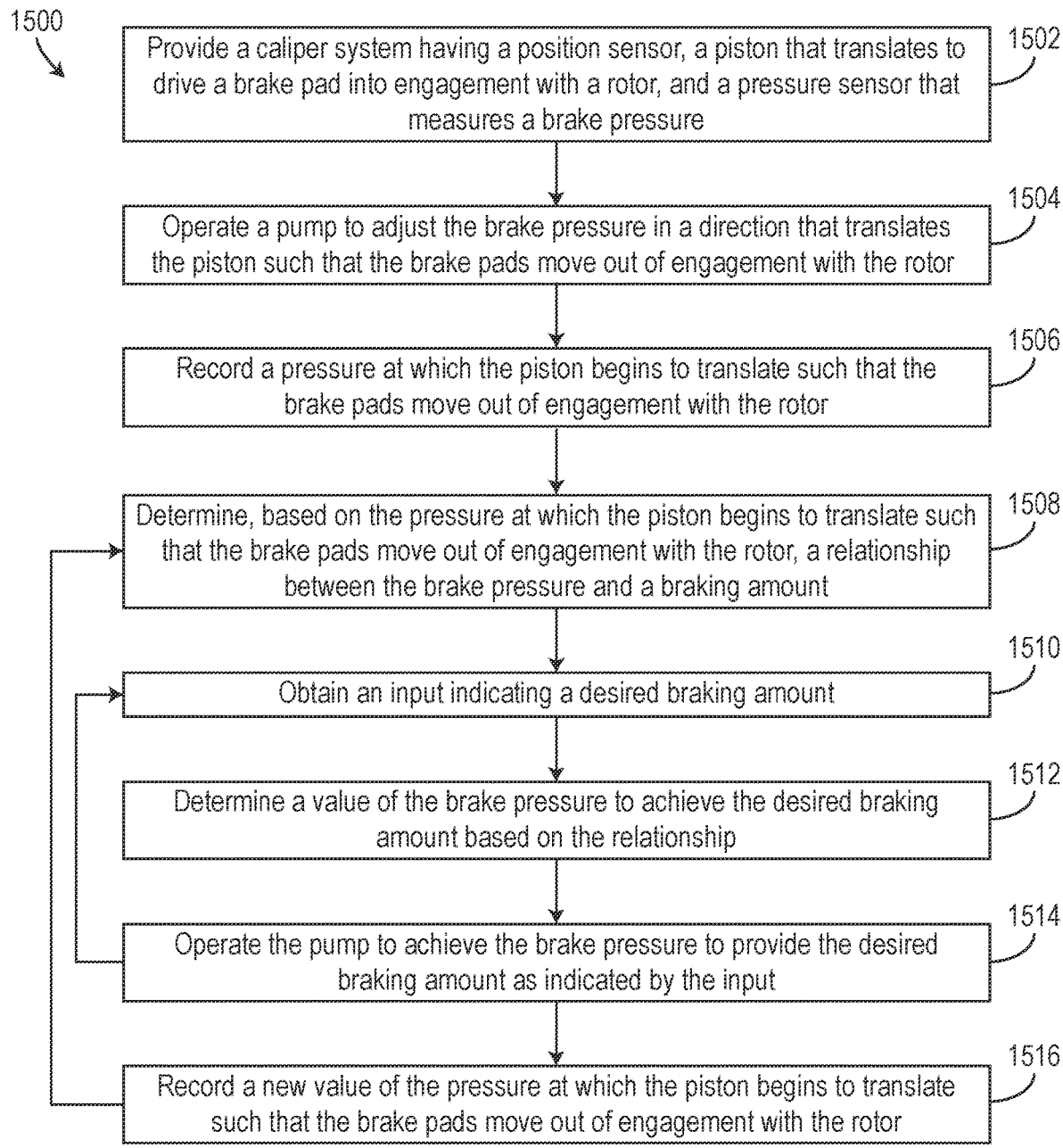
FIG. 15 is a flow diagram of a process for determining a relationship for controlling a brake system based on feedback from a position sensor, according to some embodiments.

Referring to FIG. 15, a process 1500 for determining a relationship for control of a brake includes steps 1502-1516, according to some embodiments. In some embodiments, the process 1500 is performed by the controller 802, or more particularly, by the relationship manager 814. In some embodiments, the process 1500 is performed in order to identify a relationship between brake pressure and an amount of braking, or between brake pressure and position of a piston of a brake.

The process 1500 includes providing a caliper having a position sensor, a piston that translates to drive a brake pad into engagement with a rotor, and a pressure sensor that measures a brake pressure (step 1502), according to some embodiments. In some embodiments, the step 1502 is the same as or similar to the step 1402 of the process 1400. In some embodiments, the step 1502 is the same as or similar to the step 1402 of the process 1400 or the step 1302 of the process 1300.

The process 1500 includes operating a pump to adjust the brake pressure in a direction that translates the piston such that the brake pads move out of engagement with the rotor (step 1504) and recording a pressure at which the piston begins to translate such that the brake pads move out of engagement with the rotor (step 1506), according to some embodiments. In some embodiments, the steps 1504 and 1506 are performed by operating a pump to supply brake fluid to increase pressure within a caliper of the caliper system and monitoring sensor feedback of both the pressure sensor and the position sensor. Once the piston begins to translate, as indicated by the sensor feedback from the position sensor, the pressure is recorded. In some embodiments, the step 1504 and 1506 are performed by the relationship manager 814.

The process 1500 includes determining, based on the pressure at which the piston begins to translate such that the brake pads move out of engagement with the rotor, a relationship between the brake pressure and a braking amount (step 1508), according to some embodiments. In some embodiments, the step 1508 is performed by the relationship manager 814 based on the pressure obtained in step 1506 and a regression technique. In some embodiments, the pressure and corresponding position obtained in step 1506 indicate zero point which operation of the caliper system is controlled from. In some embodiments, the relationship uses the pressure obtained in step 1506 as a pressure at which 0% of a total available braking is applied, and uses a known pressure value (e.g., 0 psi) as a pressure at which 100% of a total available braking is applied.

The process 1500 includes obtaining an input indicating a desired braking amount (step 1510), according to some embodiments. In some embodiments, the desired braking amount is provided to a controller (e.g., the controller 802) by a brake pedal or a sensor of a brake pedal (e.g., a device of the HMI 244). In some embodiments, step 1510 is performed by the control manager 816.

The process 1500 includes determining a value of the brake pressure to achieve the desired braking amount based on the relationship (step 1512), according to some embodiments. In some embodiments, the step 1512 includes providing the desired braking amount as an input to the relationship obtained in the step 1508. In some embodiments, the relationship is used to determine the pressure that will achieve the desired braking amount (e.g., 50% of the total braking, 100% of the total braking, etc.). In some embodiments, the step 1512 is performed by the control manager 816.

The process 1500 includes operating the pump to achieve the brake pressure to provide the desired braking amount, as indicated by the input (step 1514), according to some embodiments. In some embodiments, step 1514 includes operating the pump 234 based on the pressure determined in step 1512. In some embodiments, step 1514 is performed by the control manager 816. In some embodiments, step 1514 is performed by operating the pump 234 to increase or decrease current pressure (e.g., to adjust the current pressure toward the pressure determined in step 1512) while monitoring sensor feedback provided by the pressure sensor until the sensor feedback provided by the pressure sensor indicates that the current pressure is substantially equal to the pressure determined in the step 1512. In some embodiments, the process 1500 returns to step 1510 after performing step 1514. In some embodiments, the process 1500 also performs step 1516 in response to performing step 1514 such that step 1516 and/or step 1514 may be performed at least partially simultaneously with each other.

The process 1500 includes recording a new value of the pressure at which the piston begins to translate such that the brake pads move out of engagement with the rotor (step 1516), according to some embodiments. In some embodiments, the step 1516 is performed if the caliper system is operated (e.g., in normal braking operations) and the pressure at which the piston begins to translate such that the brake pads move out of engagement with the rotor changes over time. In some embodiments, the step 1516 is the same as or similar to the step 1506. In some embodiments, in response to performing step 1516, the process 1500 returns to step 1508. In some embodiments, the process 1500 can be performed to determine a relationship between the position of the piston assembly 226 and the pressure of the second sub-volume 236.

Malfunction Identification

Figure 12:
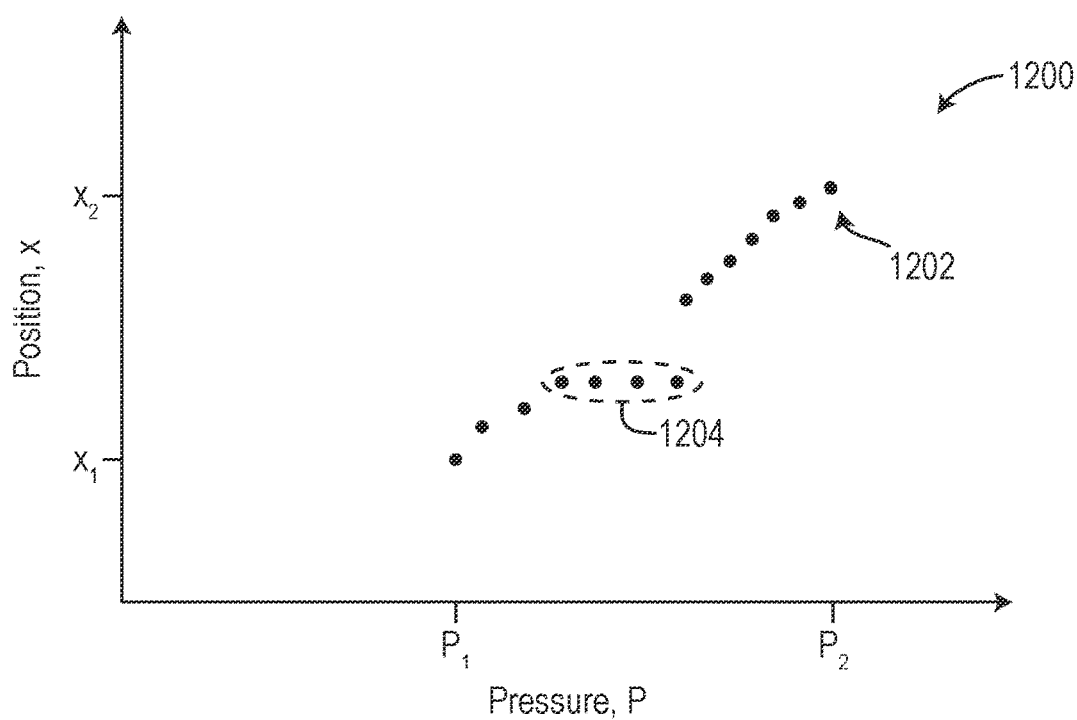
FIG. 12 is a graph showing a relationship between position of a brake piston and brake pressure when the piston a sticks at a specific location, according to some embodiments.

Referring to FIGS. 8 and 12, the controller 802 includes a malfunction detector 812, according to some embodiments. In some embodiments, the malfunction detector 812 is configured to obtain the piston position from the positional sensor 212 and pressure (e.g., of the second sub-volume 236) and use the inputs to determine if the caliper assembly 200 is operating properly or to determine if the caliper assembly 200 has malfunctioned. Malfunctioning of the caliper assembly 200 that can be detected may include but are not limited to: the piston assembly 226 sticking, rough movement of the piston assembly 226, the piston assembly 226 being limited from translating to either boundary (e.g., in the clamping direction 276 or the releasing direction 278), leaks in the brake line 272, etc.

Referring particularly to FIG. 12, a graph 1200 illustrates the resulting change in the position of the piston assembly 226 (the Y-axis) with respect to changes in the pressure of the second sub-volume 236 (the X-axis), according to some embodiments. The graph 1200 includes scatter data 1202 which may represent intermittent obtaining and plotting of the pressure and piston position provided by the pressure sensor 240 and the positional sensor 212, respectively. As shown in FIG. 12, the scatter data 1202 illustrates a generally linear relationship between the position and the pressure, with increased pressure (e.g., increasing from $p_1$ to $p_2$) resulting in increased position or translation of the piston assembly 226 (e.g., from $x_1$ to $x_2$) relative to a maximum clamping position or in the releasing direction 278, respectively.

As shown in FIG. 12, the scatter data 1202 includes a deviation from the generally linear trend between the pressure (the X-axis) and the piston position (the Y-axis), shown as data 1204. At the data 1204, the pressure p of the second sub-volume 236 is shown increasing, while the position of the piston assembly 226 remains substantially the same. The data 1204 shown in graph 1200 may illustrate the relationship that is exhibited between the piston position and the pressure when the piston assembly 226 sticks. As shown in FIG. 12, the positions $x_1$ and $x_2$ are known piston positions where the piston assembly 226 is at the end of its strokes (e.g., a maximum clamp position, and a maximum release position). Accordingly, when the piston assembly 226 is at a position between the position $x_1$ and $x_2$, changes in the pressure of the second sub-volume 236 should result in movement or translation of the piston assembly 226 (e.g., in the releasing direction 278 if the pressure is increasing, or in the clamping direction 276 if the pressure is decreasing). If the piston assembly 226 is not at either the position $x_1$ or the position $x_2$, and is not moving even with changes to the pressure of the second sub-volume 236, this indicates that the piston assembly 226 is stuck at an intermediary position, and that a malfunction has occurred.

Referring again to FIG. 8, the malfunction detector 812 of the controller 802 can determine if the piston assembly 226 is stuck at an intermediary position by comparing the current position of the piston assembly 226 to known boundary positions (e.g., $x_1$ and $x_2$) that define the total stroke path of the piston assembly 226. If the piston assembly 226 is currently between the boundary positions (e.g., $x_1 < x_{piston} < x_2$), and substantial changes in the pressure of the second sub-volume 236 do not result in changes in the position of the piston assembly 226, then the malfunction detector 812 determines that the piston assembly 226 is stuck at a current position (e.g., at the current piston position provided by the positional sensor 212) and records the current position of the piston assembly 226.

The malfunction detector 812 can also identify if there are leaks in the pump 234 or the brake line 272 based on the piston position and/or the pressure provided by the positional sensor 212 and the pressure sensor 240, according to some embodiments. In some embodiments, the malfunction detector 812 is configured to store or use a relationship, a model, an equation, etc., that predicts, estimates, or calculates an amount of movement of the piston assembly 226 (e.g., an amount of change in the current position of the piston assembly 226) responsive to a change in the pressure of the second sub-volume 236 given a current position of the piston assembly 226. In some embodiments, the relationship, the model, the equation, etc., is configured to predict or estimate a position of the piston assembly 226 given a current pressure of the second sub-volume 236. In some embodiments, the relationship, the model, the equation, etc., is configured to estimate a required pressure of the second sub-volume 236 that should result in a corresponding position of the piston assembly 226. In some embodiments, the malfunction detector 812 is configured to use the relationship, the piston position provided by the positional sensor 212, and the pressure provided by the pressure sensor 240 to determine if the pump 234 or the brake line 272 is leaking. For example, if the malfunction detector 812 identifies that an excessive amount of pressure is required to achieve a specific position, or that a certain pressure cannot be achieved or cannot be held over time, the malfunction detector 812 may determine that a leak has occurred in the pump 234 or the brake line 272.

The malfunction detector 812 can also monitor the piston position provided by the positional sensor 212 over time and identify a smoothness or an amount of noise in the sensor data provided by the positional sensor 212. If the amount of noise of the sensor data provided by the positional sensor 212 exceeds a threshold, or if the smoothness of the sensor data provided by the positional sensor 212 is not sufficiently low, the malfunction detector 812 can determine that the translation or movement of the piston assembly 226 is rough.

Figure 14:
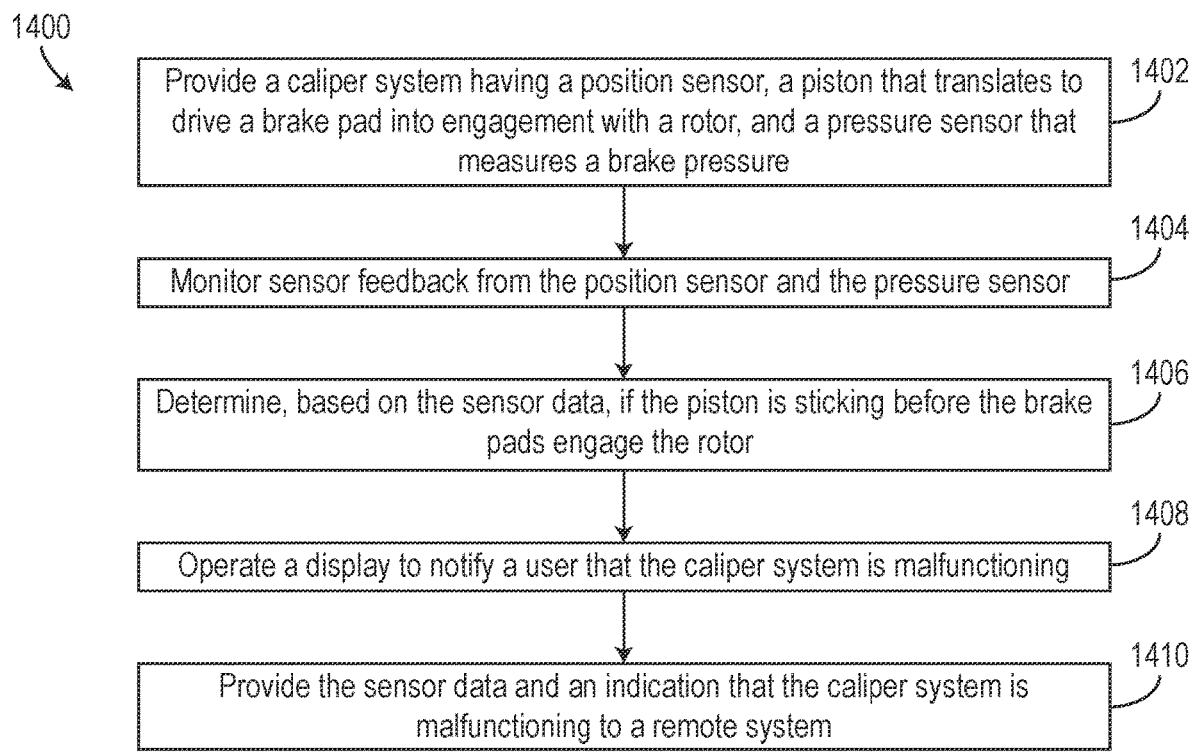
FIG. 14 is a flow diagram of a process for determining if a brake system is not functioning properly, according to some embodiments.

Referring to FIG. 14, a process 1400 for determining or identifying if a brake is operating properly or malfunctioning includes steps 1402-1410, according to some embodiments. In some embodiments, the process 1400 can be performed in real-time while a brake system is being operated and can be used to notify an operator of a vehicle that a brake of the vehicle is not operating properly, or can be used to notify a remote or third party system to prompt maintenance at the brake.

The process 1400 includes providing a caliper system having a position sensor, a piston that translates to drive a brake pad into engagement with a rotor, and a pressure sensor that measures a brake pressure (step 1402), according to some embodiments. In some embodiments, the step 1402 is the same as or similar to the step 1302. In some embodiments, the caliper system is a brake system of a vehicle (e.g., the vehicle 10).

The process 1400 includes monitoring sensor feedback from the position sensor and the pressure sensor (step 1404), according to some embodiments. In some embodiments, step 1404 is performed by the malfunction detector 812. In some embodiments, step 1404 includes obtaining the sensor feedback from the position sensor and the pressure sensor in real-time and obtaining sensor data from other systems of the vehicle on which the caliper system is installed.

The process 1400 also includes determining, based on the sensor data, if the piston is sticking before the pads engage the rotor (step 1406), according to some embodiments. For example, if the piston is at a position that is known to be (e.g., by performing the process 1300) before the brake pads engage the rotor, and the changes in the pressure do not result in expected changes in the position of the piston, the malfunction detector 812 may determine that the piston is sticking at a specific location. In some embodiments, the process 1400 is performed at least partially simultaneously with the process 1300 or is performed after the process 1300, and uses the determined or identified position of the piston when the brake pads engage the rotor to determine if the piston is sticking. In some embodiments, step 1406 includes monitoring how the position of the piston changes with respect to changes in the pressure, or determining an amount of noise in the sensor feedback from the position sensor to identify if the piston is translating roughly, which may also indicate a malfunction of the caliper assembly.

The process 1400 also includes operating a display to notify a user that the caliper system is malfunctioning (step 1408) and providing the sensor data and an indication that the caliper system is malfunctioning to a remote system (step 1410), according to some embodiments. In some embodiments, steps 1408 and 1410 are performed in response to the step 1406 (e.g., in response to identifying that the caliper system is malfunctioning). In some embodiments, the step 1408 is performed to notify an operator of the vehicle that the caliper system is installed on that the caliper system is not functioning properly. In some embodiments, the notification of step 1408 includes an identification of a reason or root-cause of why the caliper system is not functioning properly (e.g., caliper sticking at a particular location, the piston is translating rough, etc.). In some embodiments, the display is a computer or a display of a computer that is accessing a webpage (e.g., step 1408 is performed by a cloud computing system). In some embodiments, the sensor data and the indication provided to the remote system are the same as any of the data displayed in step 1408. In some embodiments, the step 1410 is performed by the controller 802.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The invention claimed is:

1. A vehicle comprising:
  a chassis;
  a plurality of tractive elements coupled with the chassis;
  a brake system for at least one of the tractive elements, the brake system comprising:
    a caliper body defining a sealed inner volume;
    a piston positioned within the sealed inner volume, the piston dividing the sealed inner volume into a first sub-volume and a second sub-volume;
    a spring positioned within the first sub-volume, the spring configured to bias the piston to extend;
    a valve configured to fluidly couple the second sub-volume with a pump;
    a plurality of brake pads configured to be driven by the piston to engage a brake rotor;
    a movable member coupled with the piston, the movable member configured to translate with translation of the piston;
    a position sensor operably coupled with the movable member and configured to generate a signal responsive to translation of the piston and the movable member; and
    a pressure sensor configured to measure a pressure at the second sub-volume; and
  a controller configured to:
    obtain signals as sensor feedback from the pressure sensor and the position sensor; and
    perform one or more processes to determine or identify:
      a degree of wear of the brake pads;
      a malfunction of the brake system; and
      a relationship defining a braking operation as a result of a specific pressure at the second sub-volume;
      wherein determining or identifying the relationship comprises:
        operating a pump to adjust the pressure of the second sub-volume in a direction that drives the piston such that the brake pads are moved out of engagement with the brake rotor;
        recording the pressure of the second sub-volume at which the piston begins to translate such that the brake pads move out of engagement with the brake rotor; and
        determining, based on the pressure of the second sub-volume at which the piston begins to translate such that the brake pads move out of engagement with the brake rotor, a relationship between the pressure of the second sub-volume and a braking amount.

2. The vehicle of claim 1, wherein the movable member is a rod that extends through a bore of the caliper body and into the second sub-volume to the piston, the movable member abutting a surface on a side of the piston that defines the second sub-volume.

3. The vehicle of claim 1, wherein the movable member is a rod that extends through the first sub-volume to the piston, the movable member abutting a surface on a side of the piston that defines the first sub-volume.

4. The vehicle of claim 1, wherein determining or identifying the degree of wear of the brake pads comprises:
at an initial time:
operating a pump to adjust the pressure of the second sub-volume to drive the piston so that the brake pads engage the brake rotor;
recording a baseline position of the piston that defines a degree of extension of the piston when the brake pads are unworn;
at a second time following the initial time:
operating the pump to adjust the pressure of the second sub-volume to drive the piston so that the brake pads engage the brake rotor;
recording a second position of the piston after the brake pads have worn an amount; and
determining, based on (i) a comparison between the baseline position of the piston and the second position of the piston, and (ii) a known thickness of the brake pads when the brake pads are unworn, the degree of wear of the brake pads; and
operating a display to notify a user regarding the degree of wear of the brake pads, or an amount of remaining life of the brake pads.

5. The vehicle of claim 1, wherein determining or identifying the malfunction of the brake system comprises:
monitoring feedback from both the position sensor and the pressure sensor;
in response to the sensor feedback provided by the position sensor not changing with respect to changes in the sensor feedback provided by the pressure sensor at an intermediate position of the piston, determining that the piston is stuck; and
operating a display to notify a user regarding a malfunction status of the brake system.

6. The vehicle of claim 1, wherein the controller is further configured to:
obtain an input from an input device comprising a desired amount of braking;
determine, based on the relationship, control signals for the pump of the brake system to achieve the desired amount of braking; and
operating the pump according to the control signals to achieve the desired amount of braking.

7. A brake system for a tractive element of a vehicle, the brake system comprising:
a caliper body defining a sealed inner volume;
a piston positioned within the sealed inner volume, the piston dividing the sealed inner volume into a first sub-volume and a second sub-volume;
a spring positioned within the first sub-volume, the spring configured to bias the piston to extend;
a valve configured to fluidly couple the second sub-volume with a pump;
a plurality of brake pads configured to be driven by the piston to engage a brake rotor;
a movable member coupled with the piston, the movable member configured to translate with translation of the piston;
a position sensor operably coupled with the movable member and configured to generate a signal responsive to translation of the piston and the movable member;
a pressure sensor configured to measure a pressure at the second sub-volume; and
a controller configured to:
obtain signals as sensor feedback from the pressure sensor and the position sensor;
perform one or more processes to determine or identify:
a degree of wear of the brake pads;
a malfunction of the brake system; and
a relationship defining a braking operation as a result of a specific pressure at the second sub-volume;
wherein determining or identifying the malfunction of the brake system comprises:
monitoring feedback from both the position sensor and the pressure sensor;
in response to the sensor feedback provided by the position sensor not changing with respect to changes in the sensor feedback provided by the pressure sensor at an intermediate position of the piston, determining that the piston is stuck; and
operating a display to notify a user regarding a malfunction status of the brake system.

8. The brake system of claim 7, wherein determining or identifying the relationship comprises:
operating a pump to adjust the pressure of the second sub-volume in a direction that drives the piston such that the brake pads are moved out of engagement with the rotor;
recording a pressure of the second sub-volume at which the piston begins to translate such that the brake pads move out of engagement with the rotor; and
determining, based on the pressure of the second sub-volume at which the piston begins to translate such that the brake pads move out of engagement with the rotor, a relationship between the pressure of the second sub-volume and a braking amount.

9. The brake system of claim 8, wherein the controller is further configured to:
obtain an input from an input device comprising a desired amount of braking;
determine, based on the relationship, control signals for the pump of the brake system to achieve the desired amount of braking; and
operating the pump according to the control signals to achieve the desired amount of braking.

10. The brake system of claim 7, wherein the movable member is a rod that extends through a bore of the caliper body and into the second sub-volume to the piston, the movable member abutting a surface on a side of the piston that defines the second sub-volume.

11. The brake system of claim 7, wherein the movable member is a rod that extends through the first sub-volume to the piston, the movable member abutting a surface on a side of the piston that defines the first sub-volume.

12. The brake system of claim 7, wherein determining or identifying the degree of wear of the brake pads comprises:
at an initial time:
operating a pump to adjust the pressure of the second sub-volume to drive the piston so that the brake pads engage the brake rotor;

recording a baseline position of the piston that defines a degree of extension of the piston when the brake pads are unworn;

at a second time following the initial time:

operating the pump to adjust the pressure of the second sub-volume to drive the piston so that the brake pad engages the brake rotor;

recording a second position of the piston after the brake pads have worn an amount; and determining, based on (i) a comparison between the baseline position of the piston and the second position of the piston, and (ii) a known thickness of the brake pads when the brake pads are unworn, the degree of wear of the brake pads; and operating a display to notify a user regarding the degree of wear of the brake pads, or an amount of remaining life of the brake pads.

13. A control system for a brake, the control system comprising:

a position sensor configured to measure a position of a piston assembly of the brake, the piston assembly comprising a piston that divides an inner volume of the brake into a first sub-volume and a second sub-volume;

a pressure sensor configured to measure a brake pressure within the second sub-volume of the brake; and a controller configured to:

operate a pump to adjust the brake pressure of the second sub-volume in a direction that drives the piston assembly such that brake pads of the brake are moved out of engagement with a rotor;

record the brake pressure of the second sub-volume at which the piston begins to translate such that the brake pads move out of engagement with the rotor;

determine, based on the pressure of the second sub-volume at which the piston begins to translate such that the brake pads move out of engagement with the rotor, a relationship between the pressure of the second sub-volume and a braking amount; and operate the pump using the relationship to perform a brake operation.

14. The control system of claim 13, wherein the controller is further configured to:

obtain an input from an input device comprising a desired amount of braking;

determine, based on the relationship, control signals for the pump to achieve the desired amount of braking; and operate the pump according to the control signals to achieve the desired amount of braking.

* * * * *